US009011784B2

(12) United States Patent
Golden et al.

(10) Patent No.: US 9,011,784 B2
(45) Date of Patent: Apr. 21, 2015

(54) CATALYST WITH LANTHANIDE-DOPED ZIRCONIA AND METHODS OF MAKING

(75) Inventors: Stephen J. Golden, Santa Barbara, CA (US); Randal Hatfield, Oxnard, CA (US); Jason D. Pless, Pottstown, PA (US)

(73) Assignee: Clean Diesel Technologies, Inc., Oxnard, CA (US)

( * ) Notice: Subject to any disclaimer, the term of this patent is extended or adjusted under 35 U.S.C. 154(b) by 173 days.

(21) Appl. No.: 13/570,055

(22) Filed: Aug. 8, 2012

(65) Prior Publication Data

US 2013/0115144 A1 May 9, 2013

Related U.S. Application Data

(60) Provisional application No. 61/521,831, filed on Aug. 10, 2011.

(51) Int. Cl.
| B01D 50/00 | (2006.01) |
| B01J 23/10 | (2006.01) |
| B01J 21/04 | (2006.01) |
| B01J 23/63 | (2006.01) |
| C01G 25/00 | (2006.01) |
| C01G 25/02 | (2006.01) |
| C01F 17/00 | (2006.01) |
| C04B 35/486 | (2006.01) |
| C04B 35/488 | (2006.01) |
| C04B 35/50 | (2006.01) |
| B01J 37/02 | (2006.01) |
| B01J 37/03 | (2006.01) |
| B01J 23/00 | (2006.01) |
| B01J 35/00 | (2006.01) |
| B01J 35/02 | (2006.01) |
| B01J 37/00 | (2006.01) |

(52) U.S. Cl.
CPC ............... *B01J 23/63* (2013.01); *C01G 25/00* (2013.01); *C01G 25/02* (2013.01); *C01P 2002/54* (2013.01); *C01F 17/0018* (2013.01); *C01P 2002/52* (2013.01); *C01P 2002/72* (2013.01); *C04B 35/486* (2013.01); *C04B 35/488* (2013.01); *C04B 35/50* (2013.01); *C04B 2235/3205* (2013.01); *C04B 2235/3224* (2013.01); *C04B 2235/3227* (2013.01); *C04B 2235/3229* (2013.01); *B01J 37/0244* (2013.01); *B01J 37/038* (2013.01); *B01J 23/002* (2013.01); *B01J 35/002* (2013.01); *B01J 35/023* (2013.01); *B01J 37/0036* (2013.01); *B01J 37/0201* (2013.01); *B01J 2523/00* (2013.01)

(58) Field of Classification Search
CPC .. B01J 23/002; B01J 37/0244; B01J 2523/48; B01J 2523/3718; B01J 2523/00; B01J 37/0201
USPC .............. 422/177, 180; 423/210, 213.5
See application file for complete search history.

(56) References Cited

U.S. PATENT DOCUMENTS 6,151,547 A * 11/2000 Kumar et al. ............... 701/101
2007/0274890 A1* 11/2007 Minoshima et al. ....... 423/213.5

*Primary Examiner* — Tom P Duong
(74) *Attorney, Agent, or Firm* — Thaddius J. Carvis

(57) ABSTRACT

The invention generally relates to three-way catalysts and catalyst formulations capable of simultaneously converting nitrogen oxides, carbon monoxide, and hydrocarbons into less toxic compounds. Such three-way catalyst formulations contain $ZrO_2$-based mixed-metal oxide support oxides doped with an amount of lanthanide. Three-way catalyst formulations with the support oxides of the present invention demonstrate higher catalytic activity, efficiency and longevity than comparable catalysts formulated with traditional support oxides.

7 Claims, 16 Drawing Sheets

The tetragonal phase is the only phase detected in the fresh samples with 10% and 15% Pr Increasing Pr content increases the stability of the tetragonal phase Inter-domain boundary between monoclinic and tetragonal facilitates gas diffusion and plays a role as diffusion pathway. Therefore, 5% $Pr-ZrO_2$ showed the better 800 °C conversion than others.

The metalized slurry (IWCP) and La-doped alumina plus $BaCO_3$ are made in parallel prior to mixing to generate the overcoat (OC).

CATALYST WITH LANTHANIDE-DOPED ZIRCONIA AND METHODS OF MAKING

CROSS REFERENCE TO RELATED APPLICATION

This application claims priority to U.S. Provisional Application No. 61/521,831, filed Aug. 10, 2011, which is incorporated herein by reference in its entirety.

TECHNICAL FIELD OF INVENTION

The invention generally relates to three-way catalysts and catalyst formulations capable of simultaneously converting nitrogen oxides, carbon monoxide, and hydrocarbons into less toxic compounds. Such three-way catalyst formulations contain $ZrO_2$-based mixed-metal oxide support oxides doped with an amount of lanthanide. Three-way catalyst formulations with the support oxides of the present invention demonstrate higher catalytic activity, efficiency and longevity than comparable catalysts formulated with traditional support oxides.

BACKGROUND OF THE INVENTION

Nitrogen oxides, carbon monoxide, and hydrocarbons are toxic and environmentally damaging byproducts found in the exhaust gas from internal combustion engines. Methods of catalytically converting nitrogen oxides, carbon monoxide, and hydrocarbons into less harmful compounds include the simultaneous conversion of these byproducts (i.e., "three-way conversion" or "TWC"). Specifically, nitrogen oxides are converted to nitrogen and oxygen, carbon monoxide is converted to carbon dioxide, and hydrocarbons are converted to carbon dioxide and water.

It has generally been found that TWC increases catalytic activity and efficiency and, thus, aids in meeting emission standards for automobiles and other vehicles. In order to achieve an efficient three-way conversion of the toxic components in the exhaust gas, conventional TWC catalysts contain large quantities of precious metals, such as Pd, Pt and Rh, dispersed on suitable oxide carriers. Typically, conventional TWC catalysts use precious metal catalysts at concentrations in the range of 30-300 g/ft$^3$, with Rh, being used in the range of 5-30 g/ft$^3$.

Commonly used catalyst systems suffer from several drawbacks. For example, commonly used TWC catalyst systems require precious metal catalysts in order to efficiently carry out the TWC. Such precious metals are expensive, can be inefficient, and have been shown to degrade over time/use.

There have been several previous attempts at improving the light-off performance of catalyst systems. Such attempts have tried to address problems relating to inefficiency of precious metal catalysts at lower temperatures and the degradation of such catalysts as a result of exposure to high temperatures. For example, some approaches utilize higher loadings of active precious metal catalysts (e.g., Rh) with predictable increases in cost. Other approaches have utilized substrate structures with a higher channel density (and, thus, higher amounts of precious metal catalyst). These approaches not only suffer from increases in cost, but also from higher back pressure. The higher back pressure, which is an artifact of the fact that the higher channel density decreases the amount of space through which exhaust may pass, results in an increase in fuel usage. A third approach has been to use a dual TWC system. Such TWC systems comprise a first TWC catalyst placed near the engine (i.e., a close coupled "CC" catalyst), thus exposing it to the engine's heat exhaust and allowing it to reach light-off temperature more quickly and a second, larger, TWC catalyst placed further away from the engine (e.g., under the floor of the vehicle) where there additional space allows for the placement of larger TWC catalysts systems. While such techniques lead to improved TWC catalyst efficiencies, they tend to decrease the lifespan of at least the CC TWC catalyst by exposing it to higher temperatures. In addition, CC TWC catalysts suffer from increased poisoning of the precious metal catalysts by virtue of their increased exposure to sulfur or phosphorous in engine exhaust. Thus, there is a trade-off between increasing catalyst efficiency at the expense of decreasing lifespan and, thus, requiring the expensive replacement of TWC catalysts.

Other methods for improving light-off performance focused on modifying the layout of the PGM catalysts in CC TWC catalysts. For example, some methods place additional or extra PGM catalysts at the front of the CC TWC catalysts as a further means of quickly bringing catalysts to their light-off temperatures. As can be expected, such catalyst designs suffer from the same drawbacks discussed above decreased lifespan by thermal degradation of the catalyst and poisoning of the catalysts by virtue of the fact that they are exposed to higher amounts of upstream exhaust—in addition to the fact that they require increased amounts of expensive PGM catalysts.

Thus, there is a need for catalyst formulations which have increased conversion efficiencies without requiring additional amounts of precious metals.

SUMMARY OF THE INVENTION

In some embodiments, the present invention relates to a support oxide comprising $ZrO_2$ doped with an amount of lanthanide. In additional embodiments, the support oxide further comprises $Al_2O_3$ or $La—Al_2O_3$. In some embodiments, the lanthanide used is La or Pr. Such support oxides are generally referred to herein as $La—ZrO_2$-based mixed-metal oxide support oxides (MMOSOs). The amount of lanthanide present in the support oxide can vary. For example, the $ZrO_2$ support oxide may be doped with between about 1-30% of the lanthanide. In some embodiments, the $ZrO_2$ support oxide is doped with between about 5-15% of the lanthanide. In other embodiments, the $ZrO_2$ support oxide is doped with about 5%, 10% or 15% of the lanthanide.

In particular embodiments, the support oxide comprises $La_{X\%}Zr_{(1-X)\%}O_2$ and/or $Pr_{X\%}Zr_{(1-X)\%}O_2$. In other particular embodiments, the support oxide comprises $La_{5\%}Zr_{95\%}O_2$, $Pr_{5\%}Zr_{95\%}O_2$, $La_{10\%}Zr_{90\%}O_2$, $Pr_{10\%}Zr_{90\%}O_2$, $La_{15\%}Zr_{85\%}O_2$, $Pr_{15\%}Zr_{85\%}O_2$, or mixtures thereof.

The support oxides of the present invention are stabilized in the tetragonal phase. Accordingly, the present invention refers to support oxides wherein the tetragonal phase is stabilized.

In some embodiments, the support oxides further comprise an oxygen storage material (OSM). Suitable OSMs include those of the general formula $Ce_{1-a-b-c-d}D_aE_bF_cZr_dO_2$, wherein a, b and c are, independently, 0-0.7; d is 0-0.9; and D, E and F are, independently, selected from the group consisting of lanthanides, alkaline earth metals and transition metals. In a particular embodiment, the OSM is $Ce_{0.3}Nd_{0.05}Pr_{0.05}Zr_{0.6}O_2$.

In another aspect, the present invention relates to washcoats comprising $La—ZrO_2$-based MMOSOs, an OSM and a catalyst. In some embodiments, the catalyst is a platinum group metal (PGM) catalyst. Examples of suitable PGM catalysts include Rh, Pt, Pd, or mixtures thereof. In particular embodiments, the PGM is Rh. In additional particular embodiments, the Rh is present at 0.25% (by weight) of the washcoat.

The present invention similarly relates to overcoats comprising La—$ZrO_2$-based MMOSOs, an OSM and a catalyst. In some embodiments, the catalyst is a platinum group metal (PGM) catalyst. Examples of suitable PGM catalysts include Rh, Pt, Pd, or mixtures thereof. In particular embodiments, the PGM is Rh. In additional particular embodiments, the Rh is present at 0.25% (by weight) of the overcoat.

The washcoats and overcoats of the present invention may constitute varying amounts of the La—$ZrO_2$-based MMOSOs. For example, the La—$ZrO_2$-based MMOSO may constitute 1-100% (by weight) of the washcoat or overcoat. In some embodiments, the La—$ZrO_2$-based MMOSO constitutes 40-80%, 45-75%, 50-70% or 55-65% (by weight) of the washcoat or overcoat. In other embodiments, the La—$ZrO_2$-based MMOSO constitutes 60% (by weight) of the washcoat or overcoat.

Moreover, the washcoats and overcoats of the present invention may constitute varying amounts of OSMs. For example, in some embodiments, the OSM constitutes 30-50% (by weight) of the washcoat or overcoat. In other embodiments, the OSM constitutes 40% (by weight) of the washcoat or overcoat.

In particular embodiments, the washcoat or overcoat comprises about:
  a) (i) 40% oxygen storage material (OSM); (ii) 30% $Al_2O_3$ or La—$Al_2O_3$; and (iii) 30% $Pr_{0.05}Zr_{0.95}O_2$;
  b) (i) 40% OSM; (ii) 30% $Al_2O_3$ or La—$Al_2O_3$; and (iii) 30% $La_{0.05}Zr_{0.95}O_2$;
  c) (i) 40% OSM; 30% $Al_2O_3$ or La—$Al_2O_3$; and (iii) 30% $Pr_{0.10}Zr_{0.90}O_2$;
  d) (i) 40% OSM; 30% $Al_2O_3$ or La—$Al_2O_3$; and (iii) 30% $La_{0.10}Zr_{0.90}O_2$;
  e) (i) 40% OSM; 30% $Al_2O_3$ or La—$Al_2O_3$; and (iii) 30% $Pr_{0.15}Zr_{0.85}O_2$;
  f) (i) 40% OSM; 30% $Al_2O_3$ or La—$Al_2O_3$; and (iii) 30% $La_{0.15}Zr_{0.85}O_2$;
  g) (i) 40% OSM; and (ii) 60% $Pr_{0.05}Zr_{0.95}O_2$;
  h) (i) 40% OSM; and (ii) 60% $La_{0.05}Zr_{0.95}O_2$;
  i) (i) 40% OSM; and (ii) 60% $Pr_{0.10}Zr_{0.90}O_2$;
  j) (i) 40% OSM; and (ii) 60% $La_{0.10}Zr_{0.90}O_2$;
  k) (i) 40% OSM; and (ii) 60% $Pr_{0.15}Zr_{0.85}O_2$; or
  l) (i) 40% OSM; and (ii) 60% $La_{0.15}Zr_{0.85}O_2$.

In another aspect, the present invention relates to catalyst systems comprising a substrate and a washcoat, wherein the washcoat comprises a La—$ZrO_2$-based MMOSO, as described above. In addition, the present invention relates to catalyst systems comprising a substrate, a washcoat, and an overcoat, wherein the washcoat comprises a La—$ZrO_2$-based MMOSO, as described above, and the overcoat comprises a support oxide, OSM, and a catalyst. In such embodiments, the catalyst in the overcoat may be Rh, Pt, Pd, or a mixture thereof, preferably Pd. In specific embodiments, the catalyst in the overcoat is Pd and is present at 100 g/$ft^3$.

The present invention further relates to catalyst systems comprising a substrate, a washcoat, and an overcoat, wherein the washcoat comprises a support oxide, an OSM and a catalyst, and the overcoat comprises a La—$ZrO_2$-based MMOSO, as described above. In such embodiments, the catalyst in the washcoat may be Rh, Pt, Pd, or a mixture thereof, preferably Pd. In specific embodiments, the catalyst in the washcoat is Pd and is present at 100 g/$ft^3$.

The catalyst systems of the present invention may be TWC catalyst systems. In addition, the catalyst systems may improve gas flow and/or light-off performance when compared to catalyst systems comprising only traditional support oxides.

The present invention also relates to methods of making the catalyst systems described above. For example, the present invention relates to a method of making a catalyst system comprising: a) depositing a washcoat comprising a La—$ZrO_2$-based MMOSO described above on a substrate; b) treating the washcoat and substrate by calcination; and c) optionally impregnating a PGM catalyst into the washcoat, followed by drying and calcination.

The present invention also relates to a method of making a catalyst system comprising: a) depositing a washcoat comprising a La—$ZrO_2$-based MMOSO described above on a substrate; b) treating the washcoat and substrate by calcination; c) optionally impregnating a PGM catalyst into the washcoat, followed by drying and calcination; d) depositing an overcoat onto the washcoat, wherein the overcoat comprises a support oxide, an OSM and a catalyst; and e) optionally impregnating a PGM catalyst into the overcoat, followed by drying and calcination.

In addition, the present invention relates to a method of making a catalyst system comprising: a) depositing a washcoat on a substrate, wherein the washcoat comprises a support oxide, an OSM and a catalyst; b) treating the washcoat and substrate by calcination; c) optionally impregnating a PGM catalyst into the washcoat, followed by drying and calcination; d) depositing an overcoat comprising La—$ZrO_2$-based MMOSO described above onto the washcoat; and e) optionally impregnating a PGM catalyst into the overcoat, followed by drying and calcination.

In each of the above methods, the washcoat (and overcoat, where applicable) may be deposited as a slurry. In such embodiments, the PGM catalyst may be preloaded onto the slurry. Such preloaded PGM catalysts may be in the form of a nitrate, acetate or chloride salt.

In embodiments wherein the PGM catalyst is impregnated onto a washcoat (or overcoat, where applicable) the PGM catalyst may be impregnated as an aqueous solution. PGM catalysts may be in the form of a nitrate, acetate or chloride salt.

The present invention also relates to methods of reducing toxic exhaust gas emissions comprising contacting gas emissions with the catalyst systems described above. In addition, the present invention refers to methods of increasing oxygen flow through a catalytic system by stabilizing the phase (m, for example, the tetragonal phase) of the support oxide present in the catalyst system. In some embodiments, the catalyst system used in these methods comprises a La—$ZrO_2$-based MMOSO described above. In other embodiments, the catalyst system used in these methods is a catalyst system described above.

In addition, the present invention relates to methods of improving the lifetime of a catalyst system comprising a PGM catalyst by: a) reducing the amount of PGM catalyst deactivated during the aging of the catalyst system; b) increasing the amount of metallic PGM initially present in the catalyst system; or c) both a) and b). In some embodiments, the catalyst system used in these methods comprises a La—$ZrO_2$-based MMOSO described above. In other embodiments, the catalyst system used in these methods is a catalyst system described above. In some embodiments the amount of Rh(0) and/or Rh(III) as $Rh_2O_3$ initially present in the catalyst system is increased. In other embodiments, the amount of Rh(0) which is converted to Rh(III) as $Rh_2O_3$ or Rh(III)-MMO during aging of the catalyst system is decreased. In a particular embodiment, the amount of Rh(0) which is converted to Rh(III)-MMO during aging of the catalyst system is decreased.

The present invention further relates to methods of improving the conversion of a) nitrogen oxides to nitrogen and oxygen; b) hydrocarbons to carbon dioxide and water; or c) both a) and b), present in exhaust gas emissions, by utilizing La—$ZrO_2$-based MMOSOs described above in the washcoat, optional overcoat, or both. The present invention also relates to methods of improving the light-off performance of a catalyst system by utilizing La—$ZrO_2$-based MMOSOs described above in the washcoat, optional overcoat, or both. Moreover, the present invention relates to methods of reducing the amount of PGM present in a catalyst system while maintaining catalyst efficiency by utilizing La—$ZrO_2$-based MMOSOs described above in the washcoat, optional overcoat, or both. In particular embodiments of each of these methods, the PGM is Rh.

Methods of TWC of gas emissions comprising contacting gas emissions with the catalyst systems described above are also contemplated by the present invention.

In some embodiments, the present invention relates to catalytic convertor systems comprising the catalyst system described above. Such catalytic convertor systems may comprise two or more catalytic converters. In some embodiments, the catalytic convertor system comprises a close coupled catalytic converter.

DETAILED DESCRIPTION OF THE INVENTION

Figure 1:
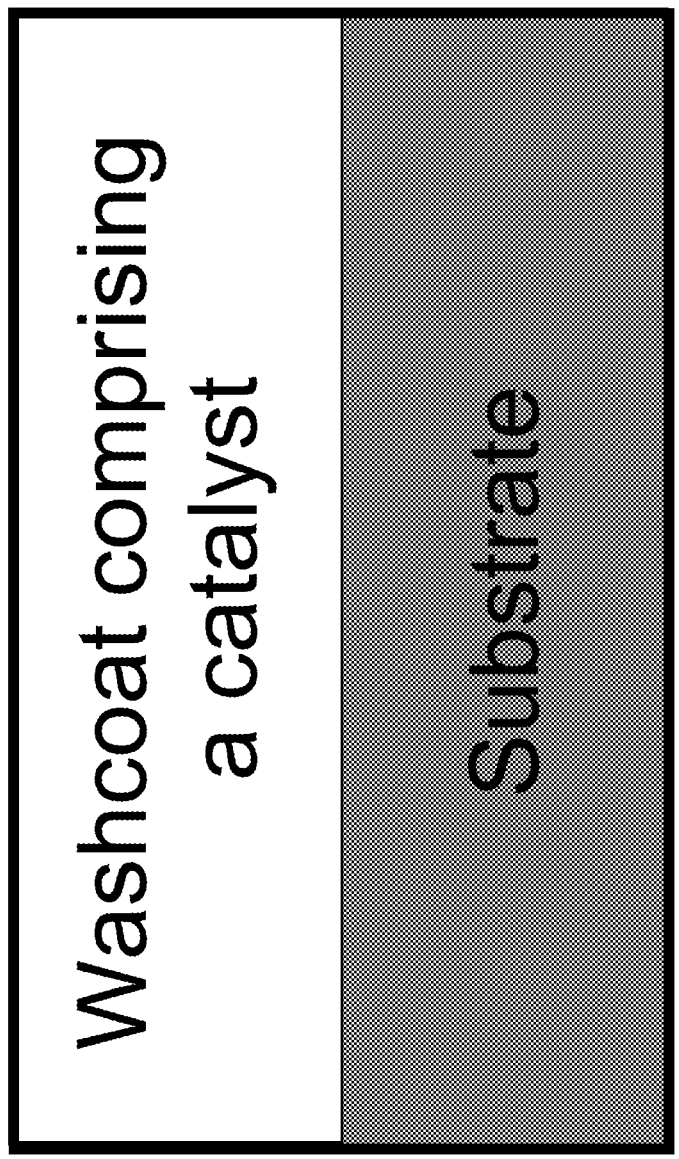
FIG. 1 is a schematic representation of a TWC catalyst comprising (1) a substrate, and (2) a washcoat containing at least one metal catalyst, wherein the washcoat is supported by the substrate.
Figure 2:
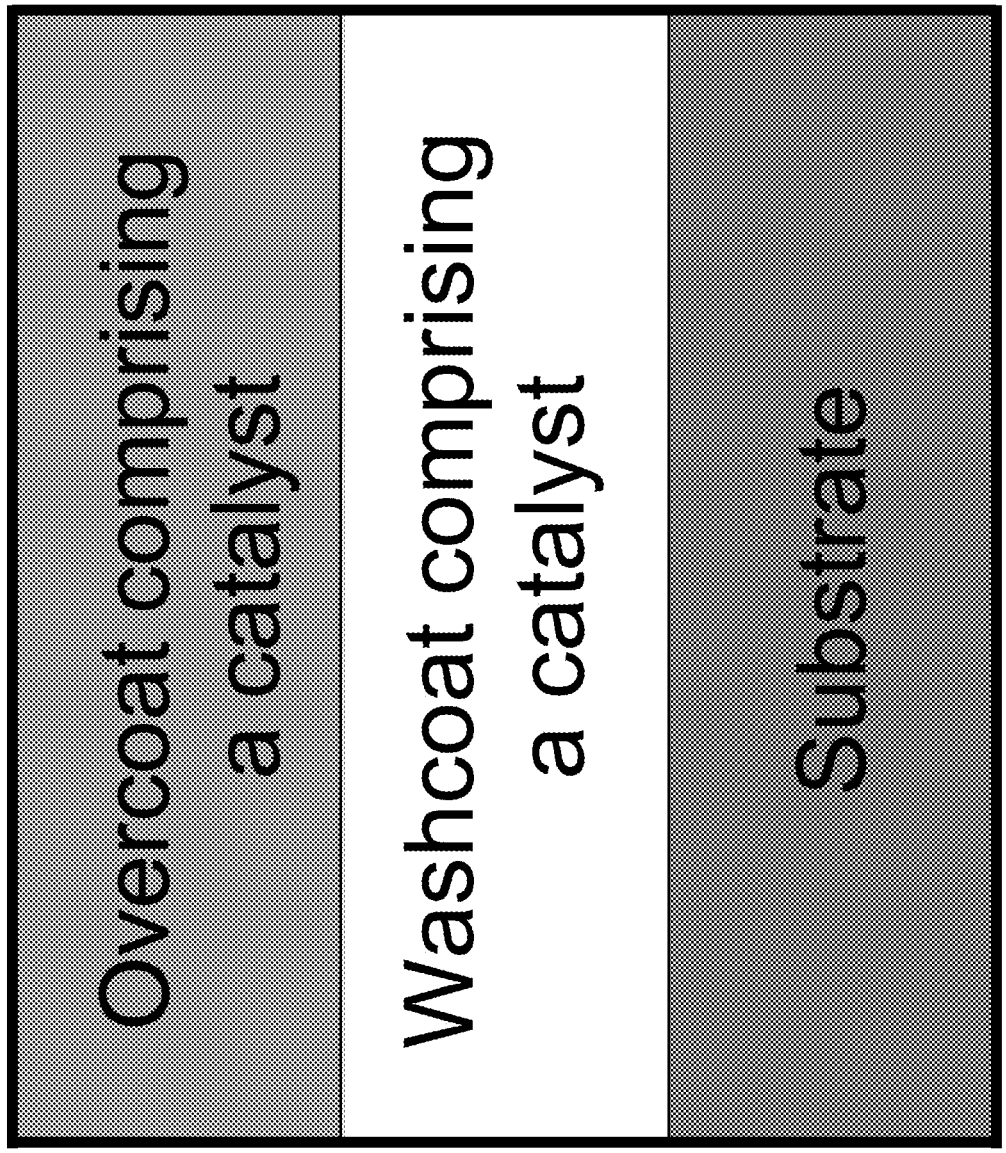
FIG. 2 is a schematic representation of a TWC catalyst comprising (1) a substrate, (2) a washcoat containing at least one metal catalyst, wherein the washcoat is supported by the substrate, and (3) an overcoat containing at least one metal catalyst, wherein the overcoat is supported by the washcoat.
Figure 3:
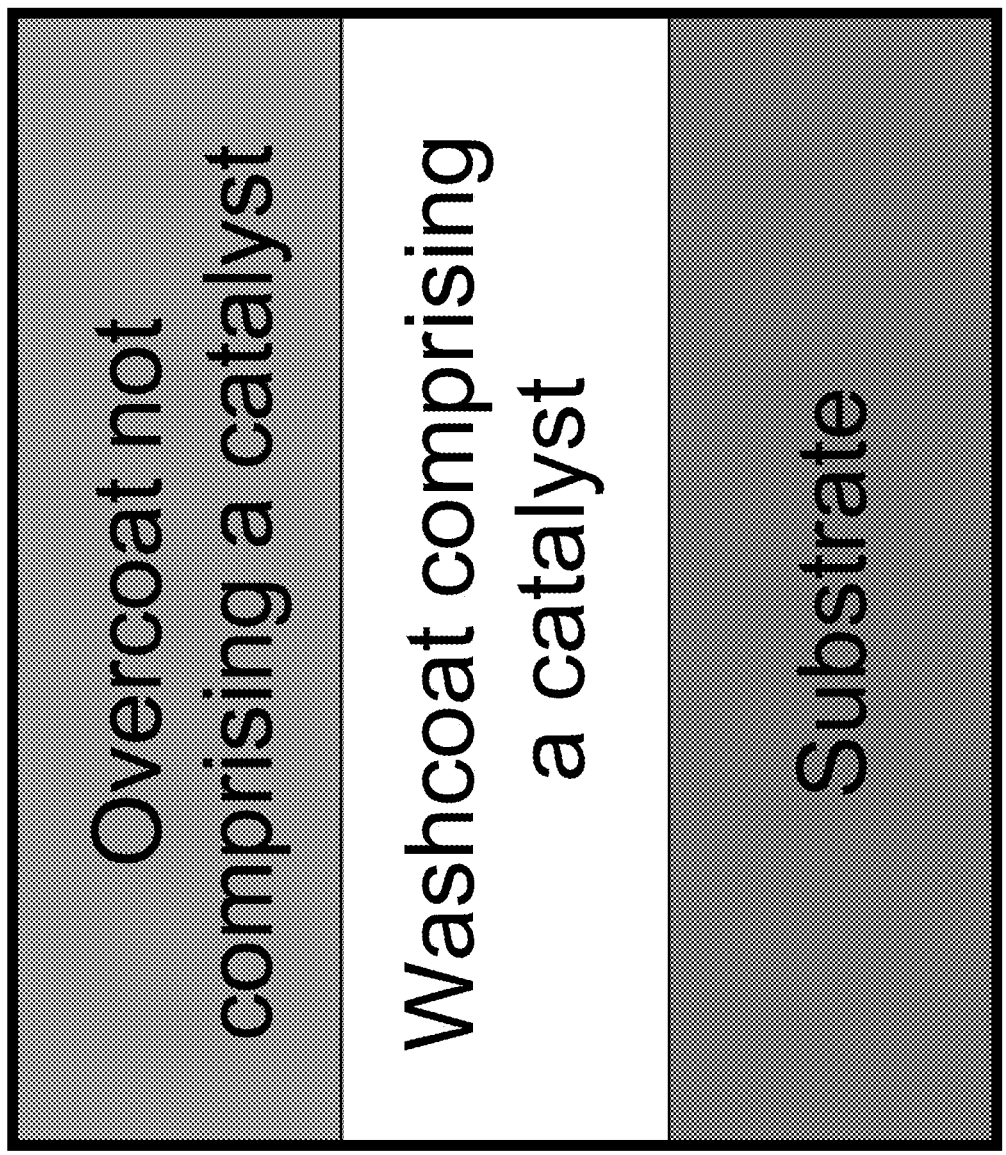
FIG. 3 is a schematic representation of a TWC catalyst comprising (1) a substrate, (2) a washcoat containing at least one metal catalyst, wherein the washcoat is supported by the substrate, and (3) an overcoat which is free of metal catalyst.
Figure 4:
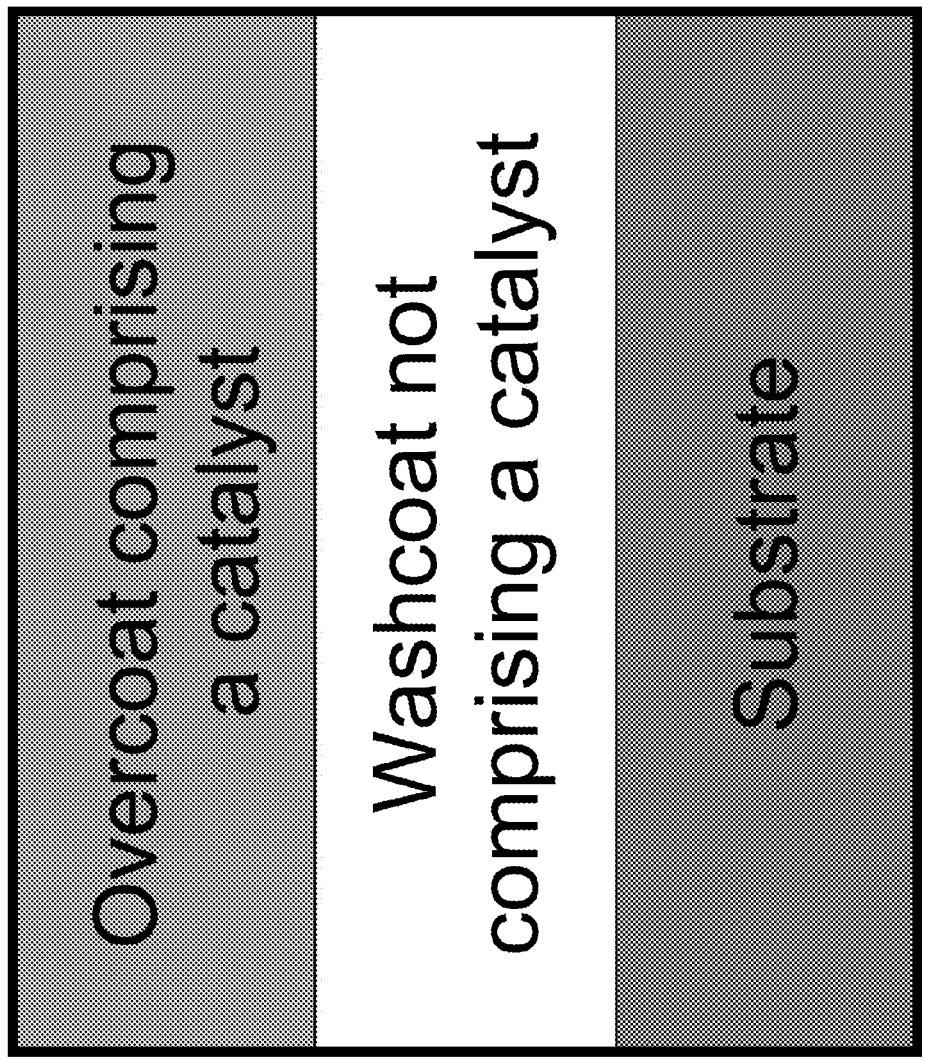
FIG. 4 is a schematic representation of a TWC catalyst comprising (1) a substrate, (2) a washcoat which is free of metal catalyst and (3) an overcoat containing at least one metal catalyst, wherein the overcoat is supported by the washcoat.
Figure 5:
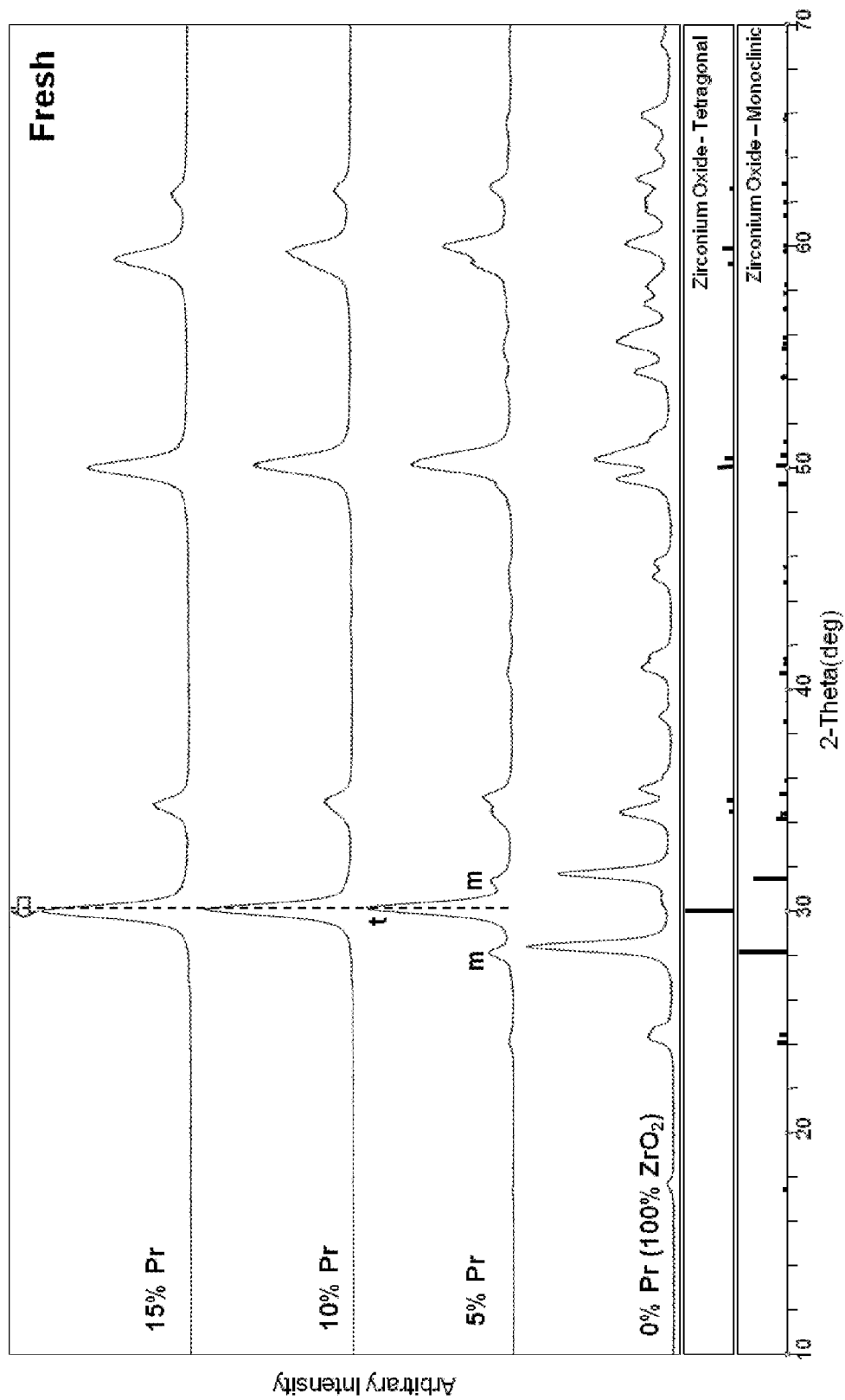
FIG. 5 shows an X-ray powder diffraction plot illustrating the relative amounts of tetragonal vs monoclinic phase in $ZrO_2$-based MMOSO doped with 5%, 10% or 15% Pr. The tested MMOSO had not been aged. It is noted that the tetragonal phase is the only phase detected in MMOSOs doped with 10% and 15% Pr.
Figure 6:
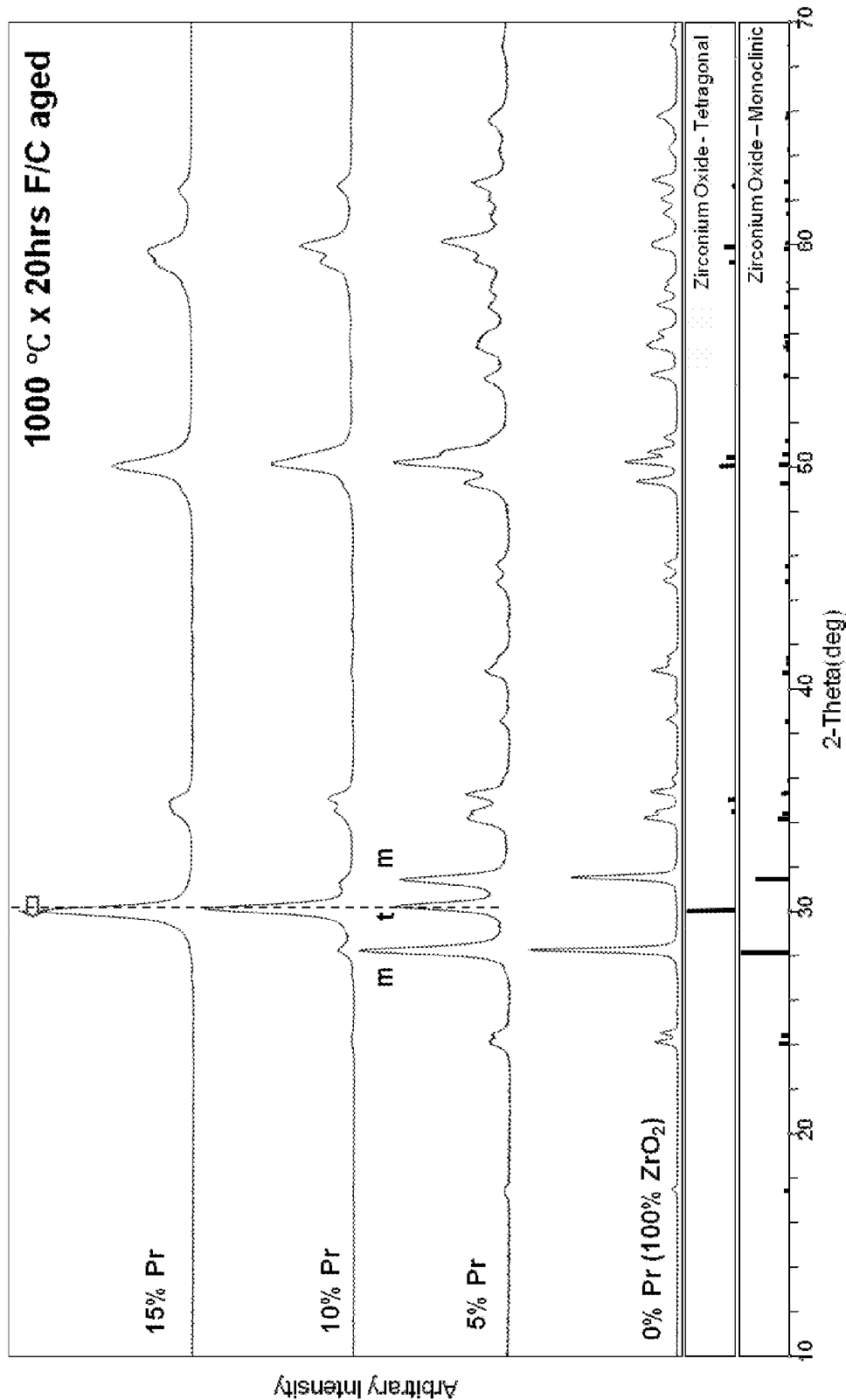
FIG. 6 Shows an X-ray powder diffraction plot illustrating the relative amounts of tetragonal vs monoclinic phase in $ZrO_2$-based MMOSO doped with 5%, 10% or 15% Pr after aging at 1000° C. for 20 hours. The data indicates that increasing the Pr content increases the stability of the tetragonal phase to aging.

In order that the invention herein described may be fully understood, the following detailed description is set forth.

Unless defined otherwise, all technical and scientific terms used herein have the same meaning as those commonly understood by one of ordinary skill in the art to which this invention belongs. Although methods and materials similar or equivalent to those described herein can be used in the practice or testing of the present invention, suitable methods and materials are described below. The materials, methods and examples are illustrative only, and are not intended to be limiting. All publications, patents and other documents mentioned herein are incorporated by reference in their entirety.

Throughout this specification, the word "comprise" or variations such as "comprises" or "comprising" will be understood to imply the inclusion of a stated integer or groups of integers but not the exclusion of any other integer or group of integers.

In order to further define the invention, the following terms and definitions are provided herein.

DEFINITIONS

The term "catalyst system" refers to any system comprising a catalyst such as a PGM catalyst. In some embodiments, the catalyst system comprises a substrate, a washcoat, and optionally an overcoat. Examples of catalyst systems are depicted in FIGS. 1-4.

The term "close-coupled catalyst" or "CC catalyst" refers to, for example, a catalytic converter which is placed close to the engine so as to be exposed to the heat generated by operation of the engine. Such CC catalysts may be TWC catalysts.

The term "Ce-containing mixed metal oxide" refers to materials based on a fluorite structure and containing Ce, Zr and, typically, several lanthanide metals. Typical examples are expressed in terms of the relative quantity of Ce and Zr (Ce-rich or Zr-rich) and the nature of the lanthanide dopants at the 1-10% level typically.

The term "conversion efficiency" refers to the percentage of emissions passing through the catalyst that are converted to their target compounds.

The term "coupled with" refers to a relationship (e.g., functional or structural) between components of a catalyst system (e.g., the relationship between the washcoat and the substrate and/or overcoat, or the relationship between the overcoat and the washcoat). In some embodiments, components which are coupled to each other are in direct contact with each other (e.g., the washcoat may be in direct contact with and, thus, coupled with the substrate). In other cases, components which are coupled to each other are coupled via additional component(s) (e.g., an overcoat is coupled to the substrate via the washcoat).

The term "high-surface area alumina" refers to aluminum oxides that have a high specific surface area—i.e., a high surface area per unit weight. High surface area aluminas typically have crystal structures designated as gamma, delta or theta.

The term "high-temperature conditions" refers to engine conditions wherein hot exhaust gas passes through a catalyst. Such exhaust gas is typically in excess of 800° C., and in extreme circumstances, in excess of 1000° C.

The term "Lanthanide group of elements" refers to the elements La, Pr, Sm, Nd, Pm, Gd, Eu, Tb, Dy, Ho, Er, Tm, Yb and Lu.

The term "Ln-doped Zirconia" refers to an oxide comprising zirconium and an amount of dopant from the Lanthanide group of elements, where Ln denotes any of the lanthanide group.

The term "light-off temperature" refers to the temperature at which a catalyst is able to convert 50% of the emissions passing through the catalyst (e.g., nitrogen oxides, carbon monoxide and unburnt hydrocarbons) to their target compounds (e.g., nitrogen and oxygen, carbon dioxide, and carbon dioxide and water, respectively).

The term "metallic Rh" refers to the element Rh in its metallic state "Rh(0)." The term "Rh(I)" refers to monovalent Rhodium (metallic Rh with one electron removed). The term "Rh(III)" refers to tri-valent Rhodium (metallic Rh with three electrons removed). Rh(III) is the stable form of Rh found in, e.g., $Rh_2O_3$.

The term "mixed metal oxide" refers to an oxide, wherein the cation positions in the oxide's crystal structure can be occupied by a variety of cations. Such cations may be selected from one or a variety of lanthanides. In particular embodiments, the mixed metal oxide cations are a mixture of either Pr and Zr, or La and Zr. The term "multiphase catalyst" or "MPC" refers to a catalyst represented by the general formula $CeyLn1-xAx+sMOz$. Such catalysts are described in, e.g., U.S. Pat. No. 7,641,875, which is incorporated herein in its entirety.

The term "overcoat" refers to a coating comprising one or more oxide solids that are coupled with a substrate and a washcoat. The oxide solids in the overcoat may be support oxides, one or more catalyst oxides, or a mixture of support oxides and catalyst oxides.

The term "oxygen storage material" or "OSM" refers to a composition which supplies oxygen to rich exhaust and takes up oxygen from lean exhaust, thus buffering a catalyst system against the fluctuating supply of oxygen. OSMs increase catalyst efficiency. Oxygen storage materials may be present in the washcoat and/or the overcoat of a catalyst system.

The term "platinum group metal" or "PGM" refers to the following six elements: ruthenium (Ru), rhodium (Rh), palladium (Pd), osmium (Os), iridium (Ir), and platinum (Pt).

The term "poisoning" or "catalyst poisoning" refers to the inactivation of a catalyst by virtue of its exposure to lead or phosphorous in, for example, engine exhaust.

The term "solid solution" refers to the doping of a metal either onto the crystallographic site of a host material, or in between crystallographic sites of a host material. Such solid solutions are composed of a single homogenous phase. The solid solution has the same crystallographic type or structure as the un-doped host material. Typically the lattice parameters of the solid solution increase or decrease with increasing dopant amount. Whether or not an increase or decrease in lattice parameters occurs depends on whether the doping cation is smaller or larger than the host cations (in addition to other specific chemical and crystallographic factors).

The term "stoichiometric point" or "stoichiometric ratio" refers to a particular air-fuel ratio (i.e., the ratio of air to fuel present in an engine during combustion). An engine operates at the stoichiometric point when exactly enough air is present in the fuel mixture to burn all of the fuel present.

The term "stabilized alumina" refers to alumina wherein modifiers are added to retard undesired phase transitions of the alumina from, for example, the gamma phase to the alpha phase, when the alumina is exposed to elevated temperatures. Such modifiers aid in stabilizing the surface area of the alumina. Alumina is exposed to high temperatures during formation of the catalyst system and during operation of the catalyst system (e.g., when it is exposed to exhaust gas). The modifiers or thermal stabilizers may include, for example, one or more modifiers or stabilizers selected from, but not limited to, rare earth oxides, silicon oxides, oxides of Group IVB metals (e.g., zirconium, hafnium, or titanium) and alkaline earth oxides. For example, lanthanide nitrate and/or strontium nitrate may be added to washcoats and/or overcoats (m, e.g., support oxides) as a modifier for the alumina. The lanthanide nitrate solution may contain a single lanthanide nitrate (e.g., lanthanum nitrate), or the solution may contain a mixture of lanthanide nitrates. Heating or calcining the lanthanide nitrate and/or strontium nitrate forms lanthanide oxide ($Ln_2O_3$) and/or strontium oxide.

The term "substrate" refers to any material known in the art for supporting a catalyst. Substrates can be of any shape or configuration that yields a sufficient surface area for the deposit of the washcoat and/or overcoat. Examples of suitable configurations for substrates include, but are not limited to, honeycomb, pellet, and bead configurations. Substrates can be made of a variety of materials including, but not limited to alumina, cordierite, ceramic and metal.

The term "three-way conversion catalyst" or "TWC catalyst" refers to a catalyst that simultaneously a) reduces nitrogen oxides to nitrogen and oxygen; b) oxidizes carbon monoxide to carbon dioxide; and c) oxidizes unburnt hydrocarbons to carbon dioxide and water. Typically, TWC catalysts require the use of precious metals such as platinum group metals.

The term "washcoat" refers to a coating comprising one or more oxide solids that is coupled to a substrate or solid support structure. The oxide solids in the washcoat may be support oxides, one or more catalyst oxides, or a mixture of support oxides and catalyst oxides.

Catalyst Systems

Catalyst systems in, for example, catalytic converters may be used in conjunction with an internal combustion engine. Such catalyst systems may be TWC catalysts. In light of the expense associated with Rh-containing catalyst systems, there remains a need for catalyst systems with improved Rh efficiencies and Rh longevity. Thus, in one aspect, the present invention provides catalyst system components which improve Rh efficiencies and Rh longevity.

The catalyst systems (including TWC catalyst systems) of the present invention may have a variety of architectures. TWC catalyst systems typically comprise (1) a substrate, (2) a washcoat supported by the substrate, and (3) an optional overcoat supported by the washcoat (see, FIGS. 1-4). For example, the TWC catalyst systems of the present invention may comprise (1) a substrate, and (2) a washcoat containing at least one catalyst, wherein the washcoat is supported by the substrate (see, FIG. 1). The catalyst systems of the present invention may also comprise (1) a substrate, (2) a washcoat containing at least one catalyst, wherein the washcoat is supported by the substrate, and (3) an overcoat containing at least one catalyst, wherein the overcoat is supported by the washcoat (see, FIG. 2). The catalyst systems of the present invention may also comprise (1) a substrate, (2) a washcoat containing at least one catalyst, wherein the washcoat is supported by the substrate, and (3) an overcoat which is relatively free of catalyst, preferably at least 95%, 99%, or at least 99.99% free of catalyst completely free (see, FIG. 3). Further, the catalyst systems of the present invention may comprise (1) a substrate, (2) a washcoat which is relatively free of catalyst, preferably at least 95%, 99%, or at least 99.99% free of catalyst, and (3) an overcoat containing at least one catalyst, wherein the overcoat is supported by the washcoat (see, FIG. 4).

Catalyst systems are typically present in two locations in automobile engines. For example, an automobile may contain two catalytic converters: 1) a close-coupled catalyst ("CC catalyst") placed near the engine; and 2) a larger catalyst placed, for example, under the floor of the vehicle where there is more room ("underfloor catalyst" of "UF catalyst"). CC catalysts are placed near the engine so they are exposed to the heat generated by operation of the engine. This heat allows the CC catalyst to more quickly reach its light-off temperature and, thus, more quickly reach its maximum efficiency. The catalyst systems of the present invention may be used in either CC or UF catalysts. In some embodiments, the catalysts systems of the present invention improve the lifetime and efficiency of CC catalysts containing Rh, even in light of the exposure of CC catalysts to elevated engine exhaust temperatures.

Improved Catalyst Systems

One aspect of the present invention is the provision of catalyst system components with improved Rh efficiencies and Rh longevity. Such components may be used in the washcoat and/or overcoats of catalyst systems. Specifically, the present invention provides support oxides for using in washcoats and/or overcoats which improve Rh efficiencies and Rh longevity. In particular embodiments, the support oxides are comprised of alumina doped with an amount of lanthanide such as praseodymium (Pr) or Lanthanum (La).

Lanthanide Doped Support Oxides

The mixed-metal oxide support oxides (MMOSOs) of the present invention improve the catalyst properties of, for example, TWC catalysts as described herein. Specifically, the MMOSOs of the present invention demonstrate higher catalytic activity, efficiency and longevity than comparable catalysts formulated with traditional support oxides. For example, the MMOSOs of the present invention improve the light-off temperature, stability/lifetime of the precious metal catalysts such as Rh, and oxygen flow in catalyst systems. In particular embodiments, the MMOSOs of the present invention improve the light-off temperature and stability/lifetime of Rh catalysts present in TWC catalyst systems.

In one aspect, the present invention refers to improved support oxides for use in catalyst systems. The support oxides of the present invention are MMOSOs such as, for example, $ZrO_2$-based MMOSOs. It has been found that doping $ZrO_2$-based MMOSOs with an amount of lanthanide yields support oxides with the improved properties discussed herein. In particular, the support oxides of the present invention have been doped with an amount of lanthanide to yield Ln-$ZrO_2$-based MMOSOs. In general, the doped $ZrO_2$-based MMOSOs of the catalyst systems are of the following formula:

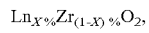

$$Ln_{X\%}Zr_{(1-X)\%}O_2,$$

wherein "X"=the amount (% by weight) of Ln cation present in the catalyst; and

"1−X"=the amount by weight of Zr cation present in the catalyst.

Any lanthanide (e.g., La, Pr, Sm, Nd, Pm, Gd, Eu, Tb, Dy, Ho, Er, Tm, Yb or Lu) may be used in the MMOSOs of the present invention. In a particular embodiment, the lanthanide used is either La or Pr. In some embodiments, the catalyst systems comprise a La—$ZrO_2$-based MMOSO, a Pr—$ZrO_2$-based MMOSO, or both. Thus, in one embodiment, the catalyst systems comprise an amount, as described herein, of $Pr_{X\%}Zr_{(1-X)\%}O_2$. In another embodiment, the catalyst systems comprise an amount, as described herein, of $La_{X\%}Zr_{(1-X)\%}O_2$. In yet another embodiment, the catalyst systems comprise an amount, as described herein, of $Pr_{X\%}Zr_{(1-X)\%}O_2$ and $La_{X\%}Zr_{(1-X)\%}O_2$.

The $ZrO_2$-based MMOSO can be doped with varying amounts of a lanthanide, such as La or Pr, to yield a Ln-$ZrO_2$-based MMOSO. For example, the $ZrO_2$-MMOSO may be doped with about 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29% or 30% of a lanthanide. In some embodiments, the $ZrO_2$-MMOSO is doped with about 5%, 10%, 15%, 20%, 25% or 30% of a lanthanide. In other embodiments, the $ZrO_2$-MMOSO is doped with about 1-5%, 1-10%, 1-15%, 1-20%, 1-25%, 1-30%, 5-10%, 5-15%, 5-20%, or 10-15% of a lanthanide.

The $ZrO_2$-based MMOSO can also be doped with up to about 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29% or 30% of a lanthanide, such as La or Pr, to yield a Ln-$ZrO_2$-based MMOSO. In some embodiments, the $ZrO_2$-based MMOSO is doped with up to about 5%, 10%, 15%, 20%, 25% or 30% of a lanthanide. In other embodiments, the $ZrO_2$-based MMOSO is doped with up to about 1-5%, 1-10%, 1-15%, 1-20%, 1-25%, 1-30%, 5-10%, 5-15%, 5-20%, or 10-15% of a lanthanide.

In particular embodiments, the $ZrO_2$-based MMOSO is doped with about 5%, 10% or 15% a lanthanide, such as La or Pr, to yield a Ln-$ZrO_2$-based MMOSO. In other embodiments, the $ZrO_2$-based MMOSO is doped with 5%, 10% or 15% a lanthanide, such as La or Pr. In one particular embodiment, the $ZrO_2$-based MMOSO is doped with 10% of a lanthanide. For example, the Ln-$ZrO_2$-based MMOSO may be: $Pr_{5\%}Zr_{95\%}O_2$; $Pr_{10\%}Zr_{90\%}O_2$; $Pr_{15\%}Zr_{85\%}O_2$; $La_{5\%}Zr_{95\%}O_2$; $La_{10\%}Zr_{90\%}O_2$; or $La_{15\%}Zr_{85\%}O_2$.

Improved Catalyst Stability/Lifetime

Traditional catalyst systems typically utilize a high surface area "transition" alumina (as a support oxide) and a Ce-containing mixed metal oxide (as an OSM). The high surface area alumina enables extensive dispersal of metal catalysts, such as Rh, allowing for effective access of the exhaust to the catalyst sites. However, traditional catalyst systems suffer from drawbacks stemming from the interaction of the Rh catalyst with the alumina support oxide under the high-temperature conditions commonly found in modern automobile engines.

The reaction of Rh catalysts with other components in the catalyst system (e.g., the support oxide) can negatively impact the efficiency of Rh-catalyzed reactions in a variety of conditions including, for example, high temperature and high engine exhaust flow rate. The species of Rh most active for $NO_x$ conversion to nitrogen gas is the metallic or Rh(0) state. During exposure of catalyst systems to high temperature exhaust, however, the Rh(0) state is oxidized to a stable, and less active, Rh(III) state (i.e., $Rh_2O_3$). The less active Rh(III) state in the $Rh_2O_3$ state can be converted back to Rh(0) via the oxidation cycle employed during use of the catalyst. That is, Rh(III) present in the $Rh_2O_3$ state may be reduced to Rh(0) through a reversible redox cycle. However, the presence of the less active Rh(III) state reduces the efficiency of the catalyst system.

In some instances, Rh(0) reacts with the alumina or ceria to form a mixed oxide with Rh(III), resulting in a very stable and inactive Rh(III) mixed metal oxide state (Rh(III)-MMO). Rh(III)-MMO cannot be reduced to Rh(0) through a reversible redox cycle. Thus, Rh present in the Rh(III)-MMO state and is essentially passivated or removed from the catalytic cycle. Such conversions are described in, for example, in Yao H. C., Jaspar, S and Shelef. M, *J. Catal.*, 50, p 407 (1977) and Yao H. C. and Gandhi H. S., *J. Catal.*, 61, p 547 (1980), each of which is incorporated herein by reference in its entirety.

Rh(0) can also be negatively affected when it interacts with the Ce-containing mixed metal oxide (the OSM). For example, during exposure to engine exhaust, Rh(0) is coated to or associated with the Ce-containing mixed metal oxide. Thus, even though the Ce-containing mixed metal oxides are beneficial because they stabilize the tetragonal phase (discussed herein), their tendency to oxidize Rh(0) detracts from their usefulness.

The overall effect of conversion of Rh(0) to either the $Rh_2O_3$ or Rh(III)-MMO state is a decrease in the amount of active Rh(0) available to act as a catalyst. The decrease in active Rh(0) is exacerbated by the fact that the efficiency of Rh-mediated catalysis is typically lower at high temperatures (e.g. at or above 800° C.), which are typical of high-speed engine conditions. For these reasons, traditional catalyst systems lead to an eventual reduction in the ability of Rh(0) to aid in $NO_x$ conversion to nitrogen gas.

The present invention addresses the Rh conversion problem by reducing the aging or degradation of the Rh in the TWC or TWC system caused by high-temperature conditions. This is accomplished by using the support oxides (Ln-$ZrO_2$-based MMOSOs) described herein. The support oxides of the present invention allow the Rh to stay more predominantly in the Rh(0) state.

Without being bound by a particular theory, it is believed that the Ln-$ZrO_2$-based MMOSOs of the present invention reduce oxidation of Rh(0) for several reasons. First, the Ln-$ZrO_2$-based MMOSOs have properties which allow them to store oxygen from exhaust gas and, in effect, sequester it from the Rh(0) catalyst. This reduces the opportunity for unwanted oxidation of Rh(0) to less desired Rh(III) states.

In addition, the Zr present in traditional support oxides has a tendency to coagulate after exposure to hot exhaust. The additional space between cations in the Ln-$ZrO_2$-based MMOSOs (e.g., Pr and Zr) furnished by the presence of the Ln allows for easier and freer diffusion of oxygen throughout the catalyst system (see, Example 8 and FIGS. 5-9).

Moreover, traditional support oxides such as alumina form a mixed phase Rh aluminate (locally) which essentially traps Rh in the Rh(III) state—a phenomenon which does not appreciably take place with Ln-$ZrO_2$-based MMOSOs.

Finally, Rh present in catalyst systems with traditional support oxides becomes buried within the support oxide after exposure of the catalyst system to high temperatures (i.e., aging). Burying the Rh has the unwanted effect of sequestering it from exhaust gases, thereby reducing the ability of the catalyst sites to participate in conversion of the exhaust.

When catalyst systems of the present invention comprising a Ln-$ZrO_2$-based MMOSO, such as Pr—$ZrO_2$-based MMOSO, are formulated with a certain amount of Rh, it has been found that such catalyst systems contain higher amounts of initial Rh(0) immediately after formulation (i.e., fresh catalyst systems) when compared to catalyst systems comprising traditional support oxides, such as La—$Al_2O_3$, formulated with the same amount of starting Rh (see Example 5). Specifically, fresh catalyst systems comprising Rh and a Pr—$ZrO_2$-based MMOSO (i.e., freshly synthesized and not aged through use) comprise more Rh(0) and reversible $Rh_2O_3$ than fresh catalyst systems comprising fresh Rh and La—$Al_2O_3$, even though the same amount of Rh was used during synthesis of the catalyst system. Interestingly, even aged catalyst systems comprising Rh and a Pr—$ZrO_2$-based MMOSO (i.e., aged under normal use conditions) comprise more Rh(0) and reversible $Rh_2O_3$ than fresh catalysts comprising fresh Rh and La—$Al_2O_3$ (see Example 5).

After standard aging, none of the Rh(III)-MMO state is observed in either the fresh or aged Rh/Pr—$ZrO_2$-based MMOSO catalysts. Comparatively, the fresh Rh/La—$Al_2O_3$ catalyst contains a measurable amount of the Rh(III)-MMO state and the aged Rh/La—$Al_2O_3$ catalyst contains significant amounts of the Rh(III)-MMO state (see Example 5).

Improved Light-Off Temperature

The light-off temperature of catalyst systems tends to rise (i.e., worsen) after exposure of the catalyst system to high temperatures. When catalyst systems are present in, for example, catalytic converters, such compositions routinely operate under high-temperature conditions. Accordingly, catalyst systems with improved light-off temperatures are extremely useful in extending the lifetime of the catalyst. Thus, in one aspect, the present invention refers to catalyst systems with improved light-off performance, even after high-temperature aging.

As discussed above, there have been several previous attempts at improving the light-off performance of catalyst systems including: utilizing higher loadings of active precious metal catalysts (e.g., Rh); utilizing substrate structures with a higher channel density (and, thus, higher amounts of precious metal catalyst); utilizing a dual TWC system comprising a first close coupled catalyst and a second, larger, TWC catalyst placed further away from the engine; and modifying the layout of the PGM catalysts in CC TWC catalysts. As also discussed above, such approaches suffer from drawbacks including: increased cost due to use of higher amounts of precious metal catalysts; increase poisoning of precious metal catalysts; increased degradation of precious metal catalysts due to exposure to higher temperatures; and decreases in exhaust and oxygen flow due to tighter packing of the catalysts systems.

The $Ln-ZrO_2$-based MMOSO catalyst systems of the present invention (such as a La—$ZrO_2$-based or Pr—$ZrO_2$-based MMOSOs), have an improved (i.e., lower) light-off temperature with respect to Rh catalyzed $NO_x$ conversion. Thus, the catalyst systems of the present invention are able to function efficiently without unnecessarily exposing the catalysts to high exhaust temperatures and without needing to increase the amount of precious metal catalyst used. For example, catalyst systems of the present invention comprising a washcoat and/or overcoat comprising $La_{0.10}Zr_{0.90}O_2$ or $Pr_{0.10}Zr_{0.90}O_2$ exhibited lower light-off temperatures when compared to catalyst systems comprising 10% La—$Al_2O_3$ (see Examples 3 and 6 and Table 5).

The improved (lower) light-off temperature is observed after typical high-temperature in-use conditions. The lower light-off temperatures are especially useful in improving catalyst efficiency when an engine is first engaged (i.e., a "cold start") because the catalytic converter is still at ambient temperature and is, thus, in a cold state.

Improved Conversion of Emission Byproducts

The catalyst systems of the present invention also exhibit improved $NO_x$ and hydrocarbon conversion efficiency in high-temperature conditions. Such improvements are typically observed in the context of Rh-catalyzed $NO_x$ and hydrocarbon conversion to nitrogen and $CO_2$/water, respectively Improvements in $NO_x$ and hydrocarbon conversion aid in designing vehicles which meet strict emissions standards.

In particular, catalyst systems of the present invention which comprise a $Ln-ZrO_2$-based MMOSO exhibit improved Rh-catalyzed $NO_x$ conversion at standard and high engine operating temperatures as measured by both the Federal Test Procedure ("FTP"; standard operating temperature) and US06 (high operating temperature) protocols. TWC catalyst systems with washcoats comprising a) 40% OSM/30% La—$Al_2O_3$/30% $Pr_{0.10}Zr_{0.90}O_2$; or b) 40% OSM/60% $Pr_{0.10}Zr_{0.90}O_2$ exhibited improved Rh-catalyzed $NO_x$ conversion when compared to catalyst systems comprising 40% OSM/60% La—$Al_2O_3$ (see Example 4 and Tables 2-3).

Further, catalyst systems with washcoats comprising a) 40% OSM/30% La—$Al_2O_3$/30% $Pr_{0.10}Zr_{0.90}O_2$; or b) 40% OSM/60% $Pr_{0.10}Zr_{0.90}O_2$ exhibit improved Rh-catalyzed non-methane hydrocarbon conversion when compared to TWC catalyst systems comprising 40% OSM/60% La—$Al_2O_3$ (see Example 4 and Tables 2-3).

Improved Washcoat/Overcoat Structure

The $Ln-ZrO_2$-based MMOSO of the present invention improve the overall structure of the washcoats or overcoats in which they are located. Without being bound by any particular theory, it is believed that the presence of the lanthanide in the $ZrO_2$ structure stabilizes the tetragonal or cubic phases of $ZrO_2$ with respect to the monoclinic phase. It is believed that these tetragonal or cubic phases of $ZrO_2$ are arranged in a manner which permits faster and easier diffusion of oxygen through the catalyst structure enhancing the activity of the catalyst (see, Example 8 and FIGS. 5-8). In addition, the Ln, such as Pr or La, present in the $Ln-ZrO_2$-based MMOSO is present as solid solution—i.e., a solid solution of Ln exists with the Zr (see, Example 8 and FIG. 9). Because solid solutions are composed of a single homogenous phase, such an arrangement also permits faster and easier diffusion of oxygen through the catalyst structure.

The effect of ease of oxygen diffusion appears to be mitigated as the amount of lanthanide present in the $Ln-ZrO_2$-based MMOSO increases beyond a certain point. For example, it has been found that doping of $ZrO_2$ with 5%, 10% or 15% of Pr has the effect of stabilizing the $ZrO_2$ support oxide in the tetragonal or cubic phases. However, the larger $Pr^{3+}$ cations (when compared to the $Zr^{4+}$ cations) may act as steric barriers to oxygen diffusion as the amount of Pr increases.

Catalyst Systems Comprising $Ln-ZrO_2$-Based MMOSOs

Overview

The catalyst systems (including TWC catalyst systems) of the present invention may have a variety of architectures. For example, a catalytic converter system present in an automobile may contain both a CC catalyst and an UF catalyst, wherein the CC catalyst is placed closer to the engine in comparison to the UF catalyst.

Both CC and/or UF catalysts typically comprise (1) a substrate, (2) a washcoat supported by the substrate, and (3) an optional overcoat supported by the washcoat. In particular embodiments, the CC and/or UF catalyst comprises (1) a substrate, (2) a washcoat supported by the substrate, and (3) an overcoat supported by the washcoat. In some embodiments of the present invention, the catalyst systems comprise CC and UF catalysts comprising a $Ln-ZrO_2$-based MMOSO. The $Ln-ZrO_2$-based MMOSO may be present in either the washcoat, the overcoat, or both of either the CC catalyst, UF catalyst, or both.

In particular embodiments, the catalyst systems, whether present in the CC or UF catalysts, comprise (1) a substrate, (2) a washcoat, wherein the washcoat is supported by the substrate, and (3) an overcoat comprising a $Ln-ZrO_2$-based MMOSO, wherein the overcoat is supported by the washcoat. In other embodiments, the catalyst systems, whether present in the CC or UF catalysts, comprise (1) a substrate, (2) a washcoat comprising a $Ln-ZrO_2$-based MMOSO, wherein the washcoat is supported by the substrate, and (3) an overcoat, wherein the overcoat is supported by the washcoat. In yet other embodiments, the catalyst systems, whether present in the CC or UF catalysts, comprise (1) a substrate, (2) a washcoat comprising a $Ln-ZrO_2$-based MMOSO, wherein the washcoat is supported by the substrate, and (3) an overcoat comprising a $Ln-ZrO_2$-based MMOSO, wherein the overcoat is supported by the washcoat.

Substrates

A variety of materials are appropriate as substrates for the present invention. For example, the substrate may be a refractive material, a ceramic substrate, a honeycomb structure, a metallic substrate, a ceramic foam, a metallic foam, a reticulated foam, or suitable combinations, where the substrate has a plurality of channels and at least the required porosity. As is known in the art, the number of channels present may vary depending upon the substrate used. It is preferred that the substrate offer a three-dimensional support structure.

The substrate may be in the form of beads or pellets. In such embodiments, the beads or pellets may be formed from, for example, alumina, silica alumina, silica, titania, mixtures thereof, or any suitable material. In a particular embodiment, the substrate may be a honeycomb substrate, for example a ceramic honeycomb substrate or a metal honeycomb substrate. The ceramic honeycomb substrate may be formed from, for example, sillimanite, zirconia, petalite, spodumene (lithium aluminum silicate), magnesium silicates, mullite, alumina, cordierite, other alumino-silicate materials, silicon carbide, aluminum nitride, or combinations thereof. Other ceramic substrates would be apparent to one of ordinary skill in the art.

In embodiments wherein the substrate is a metal honeycomb substrate, the metal may be, for example, a heat-resistant base metal alloy, particularly an alloy in which iron is a substantial or major component. In addition, metal substrate surface may be oxidized at elevated temperatures (e.g., above about 1000° C.) to improve the corrosion resistance of the alloy by forming an oxide layer on the surface of the alloy. This oxide layer on the surface of the alloy may also enhance the adherence of a washcoat to the surface of the monolith substrate.

In one embodiment, the substrate may be a monolithic carrier having a plurality of fine, parallel flow passages extending through the monolith. Such passages may be of any suitable cross-sectional shape and/or size. For example, such passages may be trapezoidal, rectangular, square, sinusoidal, hexagonal, oval, or circular, although other shapes are also suitable. The monolith may contain from about 9 to about 1200 or more gas inlet openings or passages per square inch of cross section, although fewer passages may be used.

Washcoats and Overcoats

The washcoats and overcoats of the catalyst systems of the present invention typically comprise, inter alia, a metal catalyst, an OSM, and a support oxide—each of which is described herein. In some embodiments, the washcoats may further comprise additives which aid in retarding metal catalyst poisoning.

One aspect of the present invention is the replacement of an amount of the traditional support oxide typically present in the overcoat or washcoat by an amount of Ln-$ZrO_2$-based MMOSO, such as a La—$ZrO_2$-based MMOSO or Pr—$ZrO_2$-based MMOSO. In some embodiments, an amount of the traditional support oxide typically present in the overcoat is replaced with an amount of Ln-$ZrO_2$-based MMOSO, as described herein. In some embodiments, an amount of the traditional support oxide typically present in the washcoat is replaced with an amount of Ln-$ZrO_2$-based MMOSO, as described herein. In other embodiments, an amount of the traditional support oxide typically present in the both the washcoat and overcoat is replaced with an amount of Ln-$ZrO_2$-based MMOSO, as described herein.

Figure 16:
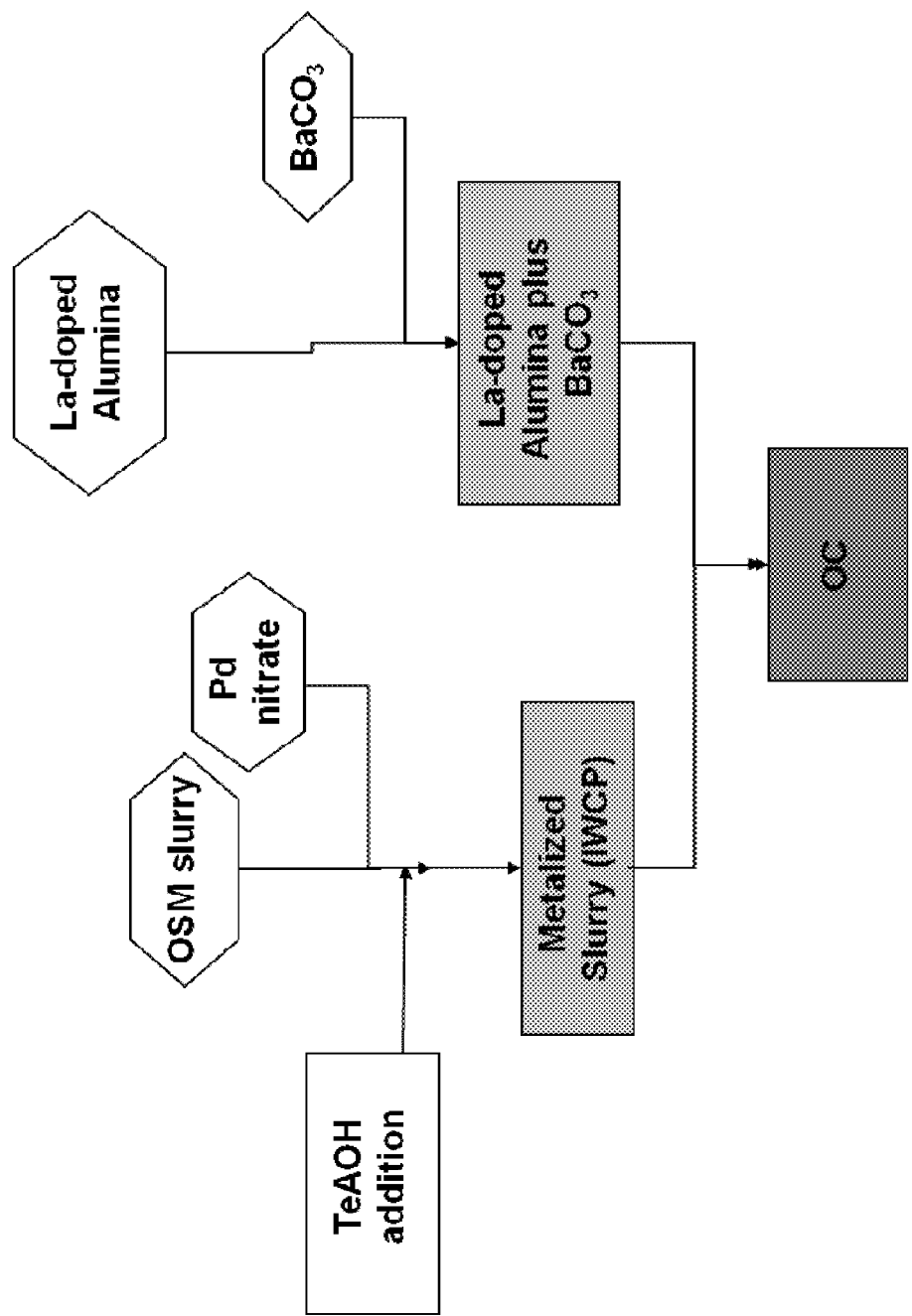
FIG. 16 is a flowchart illustrating the steps of the IWCP.

In some embodiments the washcoats and overcoats of the catalyst systems of the present invention can be used in conjunction with an OSM made by the Improved Wet Chemical Process (IWCP) (see, Example 10 and FIG. 16) or the High Temperature Process (HTP) (see, Example 11).

Metal Catalysts

The metal catalysts present in the catalyst systems of the invention are typically present in the washcoat and/or overcoat (if one is present). Metal catalysts useful for the present invention include PGM, zirconia, alumina or lanthanide catalysts. The washcoat and overcoat may contain the same metal catalyst or different metal catalysts. In addition, the washcoat and overcoat may contain the same combination of metal catalysts (e.g., both contain metal catalysts "A" and "B") or different combinations of catalysts (e.g., the washcoat contains metal catalysts "A" and "B" while the substrate contains metal catalysts "C" and "D").

In some embodiments, the metal catalysts used are PGM catalysts—i.e., Ru, Rh, Pd, Os, Ir, Pt, or combinations thereof. In some embodiments, the metal catalysts used are Rh, Pd, Pt, or combinations thereof.

In particular, Rh plays a critical role in the TWC process with respect to the conversion of nitrogen oxides ($NO_x$) to nitrogen and oxygen, and of hydrocarbons to carbon dioxide and water. As emissions standards tighten (specifically $NO_x$ emissions) the tendency is to use higher amounts of expensive Rh metal oxides in catalysts in order to meet such standards. This is especially problematic for catalytic converters used in engines wherein $NO_x$ emissions (so-called engine-out emissions) are particularly high. Further, in order for new vehicles to meet CARB (California Air Resources Board) and EPA (Environmental Protection Agency) tailpipe regulations, $NO_x$ conversion efficiencies must generally be in excess of 95% and, in some cases, higher than 99%.

Accordingly, in one aspect, the present invention provides catalyst systems comprising Rh and a Ln-$ZrO_2$-based MMOSO. In one embodiment, the washcoat of a catalyst system comprises Rh and a Ln-$ZrO_2$-based MMOSO. In another embodiment, the overcoat of a catalyst system comprises Rh and a Ln-$ZrO_2$-based MMOSO. In yet another embodiment, the washcoat and overcoat of a catalyst system comprises Rh and a Ln-$ZrO_2$-based MMOSO. In some embodiments, the catalyst systems of the present invention are present in TWC catalysts. In other embodiments, the catalyst systems of the present invention are present in catalytic converters.

Oxygen Storage Materials

Catalytic converters may be exposed to exhaust that is either rich (contains a high amount of unburnt fuel compared to oxygen) or lean (contains a low amount of unburnt fuel compared to oxygen). Oxygen storage materials (OSMs) supply oxygen to rich exhaust and take up oxygen from lean exhaust, buffering the catalyst systems against the fluctuating supply of oxygen and, in turn, increasing catalyst efficiency. Thus, oxygen storage materials present in, for example, TWC catalyst systems, allow the conversion efficiency of the catalyst system to remain relatively constant even in the face of varying inlet air/fuel ratios. OSMs may be comprised of zirconia, lanthanides, alkaline earth metals, transition metals, cerium oxide materials, or mixtures thereof. The use of cerium oxide in catalytic converters is described in "Critical Topics in Exhaust Gas Treatment" (Research Studies Press Ltd, Baldock, Hertfordshire, England, 2000), which is incorporated herein by reference in its entirety.

In some embodiments the OSM has a composition according to the formula:

$$Ce_{1-a-b-c-d}D_aE_bF_cZr_dO_2, \text{ wherein:}$$

a, b and c may be, independently, 0-0.7;

d may be 0-0.9; and

D, E and F may be, independently, selected from the group consisting of lanthanides, alkaline earth metals and transition metals.

In some embodiments, D is Nd and a may be 0.01-0.20, 0.01-0.15, 0.01-0.10, 0.02-0.08, 0.03-0.07, or 0.04-0.06. In a particular embodiment, D is Nd and a=0.05.

In some embodiments, E is Pr and b may be 0.01-0.20, 0.01-0.15, 0.01-0.10, 0.02-0.08, 0.03-0.07, or 0.04-0.06. In a particular embodiment, E is Pr and b=0.05.

In some embodiments, c=0.

In some embodiments, d may be 0.2-0.8, 0.3-0.7, 0.4-0.7, 0.5-0.7, or 0.55-0.65. In a particular embodiment, d=0.6.

In a particular embodiment, the OSM of the present invention has the following formula: $Ce_{0.3}Nd_{0.05}Pr_{0.05}Zr_{0.6}O_2$.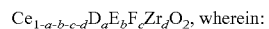

In some embodiments, the OSM constitutes about 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69% 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% or 100% of the total weight of the washcoat and/or overcoat. In one embodiment, the OSM constitutes about 20-60% of the total weight of the washcoat and/or overcoat. In another embodiment, the OSM constitutes about 30-50% of the total weight of the washcoat and/or overcoat. In yet another embodiment, the OSM constitutes about 39-41%, 38-42%, 37-43%, 36-44%, or 35-45% of the total weight of the washcoat and/or overcoat. In one embodiment, the OSM constitutes about 40%, 80% or 100% of the total weight of the washcoat and/or overcoat. In one embodiment, the OSM constitutes 40%, 80% or 100% of the total weight of the washcoat and/or overcoat.

In some embodiments, the OSM constitutes up to about 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69% 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% or 100% of the total weight of the washcoat and/or overcoat. In one embodiment, the OSM constitutes up to about 20-60% of the total weight of the washcoat and/or overcoat. In another embodiment, the OSM constitutes up to about 30-50% of the total weight of the washcoat and/or overcoat. In yet another embodiment, the OSM constitutes up to about 39-41%, 38-42%, 37-43%, 36-44%, or 35-45% of the total weight of the washcoat and/or overcoat. In one embodiment, the OSM constitutes up to about 40%, 80% or 100% of the total weight of the washcoat and/or overcoat. In one embodiment, the OSM constitutes up to 40%, 80% or 100% of the total weight of the washcoat and/or overcoat.

Support Oxides

Support oxides are, generally, porous solid oxides which are used to provide a high surface area which aids in oxygen distribution and exposure of catalysts to reactants such as $NO_x$, CO, and hydrocarbons. Support oxides are normally stable at high temperatures as well as at a range of reducing and oxidizing conditions. Metal catalysts present in the washcoat, overcoat (if one is present), or both, are typically supported by support oxides.

The amount of support oxide present in a catalyst system may vary depending on where in the system the support oxide is present. In some embodiments, the washcoat and overcoat (if one is present) of a catalyst system may contain the same amount of support oxide. In other embodiments, the washcoat and overcoat (if one is present) of a catalyst system may contain different amounts of support oxide.

Compounds used in traditional support oxides include, but are not limited to, gamma-alumina, ceria-based powders, or any mixture of titania, silica, alumina (transition and alpha-phase), ceria, zirconia, $Ce_{1-\alpha}Zr_\alpha O_2$, and any possible doped ceria formulations. A transition phase is a meta-stable phase of alumina (beta, gamma, theta, delta) that transforms to the stable alpha-alumina with sufficient time and temperature. In a preferred embodiment, the support oxide is alumina.

Modifiers may optionally be added to the alumina to retard undesired phase transitions of the alumina from the gamma phase to the alpha phase when the alumina is exposed to elevated temperatures—i.e., to stabilize the alumina. Examples of suitable modifiers (or thermal stabilizers) include, for example, rare earth oxides, silicon oxides, oxides of Group IVB metals (zirconium, hafnium, or titanium), alkaline earth oxides, or combinations thereof. Alumina is typically utilized in the washcoat as a high surface area carrier solid or support and is referred to as "gamma alumina" or "activated alumina." Suitable alumina compositions generally have a BET (Brunauer, Emmett and Teller) surface area of 60 m$^2$/g or more and, often, about 200 m$^2$/g or more.

Specific examples of suitable stabilizing agents include lanthanide oxides ($Ln_2O_3$) and/or strontium oxide (SrO). Such lanthanide- and strontium-based stabilizing agents are typically added to support oxides (e.g., alumina) as a solution of lanthanide nitrate, strontium nitrate, or mixtures thereof. Heating or calcining the lanthanide nitrate and/or strontium nitrate then forms the desired oxide. A particular example of a useful stabilized alumina is La—$Al_2O_3$.

In one aspect, the present invention improves upon catalyst systems by replacing an amount of the traditional alumina support oxide with an amount of the Ln-$ZrO_2$-based MMOSOs of the present invention. In some embodiments, the Ln-$ZrO_2$-based MMOSOs of the present invention are utilized in the washcoat of the catalyst systems. In other embodiments, the Ln-$ZrO_2$-based MMOSOs are utilized in the overcoat of the catalyst system, if an overcoat is present. In yet other embodiments, the Ln-$ZrO_2$-based MMOSOs are in utilized both the washcoat and the overcoat of the catalyst system, if an overcoat is present. In some embodiments, the Ln-$ZrO_2$-based MMOSOs is utilized in a layer wherein Rh is present, Any of the metal catalysts described above may be used in combination with the Ln-$ZrO_2$-based MMOSOs. As noted, the support oxides of the present invention have a particularly beneficial impact on Rh lifetime and efficiency. However, metal catalysts such Rh, Pd, Pt, or combinations thereof, may be used in catalyst systems comprising Ln-$ZrO_2$-based MMOSOs.

The amount of traditional alumina support oxide in the washcoat and/or overcoat replaced with an amount of Ln-$ZrO_2$-based MMOSO, such as La—$ZrO_2$-based MMOSO or Pr—$ZrO_2$-based MMOSO, can vary. Thus, in one embodiment, about 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% or 100% of the traditional alumina is replaced with a corresponding amount of Ln-$ZrO_2$-based MMOSO. In other embodiments, about 10%, 20%, 30%, 40%, 50%, 60%, 70%, 80%, 90% or 100% of the traditional alumina is replaced with a corresponding amount of Ln-$ZrO_2$-based MMOSO. In yet other embodiments, about 10%, 50% or 100% of the traditional alumina is replaced with a corresponding amount of Ln-$ZrO_2$-based MMOSO. In a particular embodiment, about 50% or about 100% of the traditional alumina is replaced with a corresponding amount of Ln-$ZrO_2$-based MMOSO. In another particular embodiment, 50% or 100% of the traditional alumina is replaced with a corresponding amount of Ln-$ZrO_2$-based MMOSO.

In some embodiments, about 10-90%, 20-80%, 30-70%, 40-60%, 45-55%, 80-100%, 90-100%, or 95-100% of the traditional alumina is replaced with a corresponding amount of Ln-ZrO$_2$-based MMOSO. In other embodiments, about 49-51%, 48-52%, 47-53%, 46-54%, 91-100%, 92-100%, 93-100%, 94-100%, 95-100%, 96-100%, 97-100%, 98-100%, or 99-100% of the traditional alumina is replaced with a corresponding amount of Ln-ZrO$_2$-based MMOSO.

In some embodiments, up to about 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% or 100% of the traditional alumina is replaced with a corresponding amount of Ln-ZrO$_2$-based MMOSO. In other embodiments, up to about 10%, 20%, 30%, 40%, 50%, 60%, 70%, 80%, 90% or 100% of the traditional alumina is replaced with a corresponding amount of Ln-ZrO$_2$-based MMOSO. In yet other embodiments, up to about 10%, 50% or 100% of the traditional alumina is replaced with a corresponding amount of Ln-ZrO$_2$-based MMOSO. In a particular embodiment, up to about 50% or about 100% of the traditional alumina is replaced with a corresponding amount of Ln-ZrO$_2$-based MMOSO. In another particular embodiment, up to 50% or 100% of the traditional alumina is replaced with a corresponding amount of Ln-ZrO$_2$-based MMOSO.

In some embodiments, up to about 10-90%, 20-80%, 30-70%, 40-60%, 45-55%, 80-100%, 90-100%, or 95-100% of the traditional alumina is replaced with a corresponding amount of Ln-ZrO$_2$-based MMOSO. In other embodiments, up to about 49-51%, 48-52%, 47-53%, 46-54%, 91-100%, 92-100%, 93-100%, 94-100%, 95-100%, 96-100%, 97-100%, 98-100%, or 99-100% of the traditional alumina is replaced with a corresponding amount of Ln-ZrO$_2$-based MMOSO.

The Ln-ZrO$_2$-based MMOSO of the catalyst systems of the present invention, such as La—ZrO$_2$-based MMOSO or Pr—ZrO$_2$-based MMOSO, may constitute about 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98% or 99% of the washcoat, and/or the overcoat (if one is present) by weight. In some embodiments, the Ln-ZrO$_2$-based MMOSO constitutes about 5-60%, 10-50%, 20-40%, 20-80%, 40-80%, or 50-70% of the washcoat and/or the overcoat (if one is present), by weight. In other embodiments, the Ln-ZrO$_2$-based MMOSO constitutes about 29-31%, 28-32%, 27-33%, 26-34%, 25-35%, 59-61%, 58-62%, 57-63%, 56-64% or 55-65% of the washcoat. In other embodiments, the Ln-ZrO$_2$-based MMOSO constitutes about 30% or 60% of the washcoat. In one embodiment, the Ln-ZrO$_2$-based MMOSO of constitutes 30% or 60% of the washcoat.

The Ln-ZrO$_2$-based MMOSO of the catalyst systems of the present invention such as La—ZrO$_2$-based MMOSO or Pr—ZrO$_2$-based MMOSO, may also constitute up to about 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98% or 99% of the washcoat, and/or the overcoat (if one is present) by weight. In some embodiments, the Ln-ZrO$_2$-based MMOSO constitutes up to about 5-60%, 10-50%, 20-40%, 20-80%, 40-80%, or 50-70% of the washcoat and/or the overcoat (if one is present), by weight. In other embodiments, the Ln-ZrO$_2$-based MMOSO constitutes up to about 29-31%, 28-32%, 27-33%, 26-34%, 25-35%, 59-61%, 58-62%, 57-63%, 56-64% or 55-65% of the washcoat. In other embodiments, the Ln-ZrO$_2$-based MMOSO constitutes up to about 30% or 60% of the washcoat. In one embodiment, the Ln-ZrO$_2$-based MMOSO of constitutes up to 30% or 60% of the washcoat.

Additives

The washcoats and overcoats of the catalyst systems of the present invention may contain additives which aid in retarding the poisoning of precious metal catalysts by phosphorus and sulfur. Consumption of engine lubricants results in the generation of phosphorus and, in turn, the poisoning and deactivation of precious metal catalysts. Thus, additives such as calcium, barium, lanthanides and/or cerium may be added to the washcoats and/or overcoats (if present) as a means of retarding the poisoning process. In some embodiments, the additive is CaCO$_3$, La$_2$O$_3$ or BaCO$_3$. In a particular embodiment, the additive is BaCO$_3$. It is noted that, upon exposure to exhaust containing, for example phosphorous, CaCO$_3$, La$_2$O$_3$ and BaCO$_3$ are converted to Ca$_3$(PO$_4$)$_2$, LaPO$_4$ and Ba$_3$(PO$_4$)$_2$, respectively.

Amounts of such additives suitable for use in catalyst systems are well known in the art.

Catalyst Systems Comprising Lanthanide Doped Support Oxides

Accordingly, the washcoats and/or overcoats of the present invention comprise, inter alia, by weight: a % of OSM; a % of traditional support oxide, and a % of Ln-ZrO$_2$-based MMOSO. In particular embodiments, the catalyst systems of the present invention comprise, by weight: a % of Ce-based OSM; a % of Al$_2$O$_3$ or La—Al$_2$O$_3$; and a % of Pr$_{X\%}$Zr$_{(1-X)\%}$O$_2$, as described herein. In some embodiments, the catalyst systems of the present invention comprise, by weight: 40% of Ce-based OSM; 30% Al$_2$O$_3$ or La—Al$_2$O$_3$; and 30% of Pr$_{X\%}$Zr$_{(1-X)\%}$O$_2$, as described herein. In other embodiments, the catalyst systems of the present invention comprise, by weight: 40% of Ce-based OSM; and 60% of Pr$_{X\%}$Zr$_{(1-X)\%}$O$_2$, as described herein. In a particular embodiment, the catalyst systems of the present invention comprise: 40% (Ce$_{0.3}$Nd$_{0.05}$Pr$_{0.05}$Zr$_{0.6}$O$_2$); 30% (La—Al$_2$O$_3$); and 30% (Pr$_{X\%}$Zr$_{(1-X)\%}$O$_2$) (i.e., 50% of the traditional alumina is replaced with Pr$_{X\%}$Zr$_{(1-X)\%}$O$_2$). In another particular embodiment, the catalyst systems of the present invention comprise: 40% (Ce$_{0.3}$Nd$_{0.05}$Pr$_{0.05}$Zr$_{0.6}$O$_2$); and 60% of Pr$_{X\%}$Zr$_{(1-X)\%}$O$_2$ (i.e., 100% of the traditional alumina is replaced with Pr$_{X\%}$Zr$_{(1-X)\%}$O$_2$). As discussed herein, in such embodiments, X can be, for example, 5%, 10% or 15%. In addition, as discussed herein, such OSM/support oxides may be in the washcoat, overcoat, or both.

In other particular embodiments, the catalyst systems of the present invention comprise, by weight: % of Ce-based OSM; a % of Al$_2$O$_3$ or La—Al$_2$O$_3$; and a % of La$_{X\%}$Zr$_{(1-X)\%}$O$_2$, as described herein. In some embodiments, the catalyst systems of the present invention comprise, by weight:

40% of Ce-based OSM; 30% $Al_2O_3$ or $La-Al_2O_3$; and 30% of $La_{X\%}Zr_{(1-X)\%}O_2$, as described herein. In other embodiments, the catalyst systems of the present invention comprise, by weight: 40% of Ce-based OSM; and 60% of $La_{X\%}Zr_{(1-X)\%}O_2$, as described herein. In a particular embodiment, the catalyst systems of the present invention comprise: 40% $(Ce_{0.3}Nd_{0.05}\ La_{0.05}Zr_{0.6}O_2)$; 30% $(La-Al_2O_3)$; and 30% $(La_{X\%}Zr_{(1-X)\%}O_2)$ (i.e., 50% of the traditional alumina is replaced with $La_{X\%}Zr_{(1-X)\%}O_2$). In another particular embodiment, the catalyst systems of the present invention comprise: 40% $(Ce_{0.3}Nd_{0.05}\ La_{0.05}\ Zr_{0.6}O_2)$; and 60% of $La_{X\%}Zr_{(1-X)\%}O_2$ (i.e., 100% of the traditional alumina is replaced with $La_{X\%}Zr_{(1-X)\%}O_2$). As discussed herein, in such embodiments, X can be, for example, 5%, 10% or 15%. In addition, as discussed herein, such OSM/support oxides may be in the washcoat, overcoat, or both.

In a particular embodiment the catalyst system comprises a washcoat and an overcoat as follows. The washcoat, loaded at 180 g/L, comprises $La-Al_2O_3$ and an OSM (30% $CeO_2$, 60% $ZrO_2$, 5% $Nd_2O_3$ and 5% $Pr_6O_{11}$) in a ratio of 1.5:1 (by weight). The washcoat is impregnated with Pd to give a final Pd loading in the washcoat of about 139.3 $g/ft^3$. Barium is also impregnated into the washcoat to give a Pd:Ba ratio of 1:6. The overcoat (loaded onto the washcoat at 60 g/L) comprises $(Pr_{0.10}Zr_{0.90}O_2):(30\%\ CeO_2, 60\%\ ZrO_2, 5\%\ Nd_2O_3, 5\%\ Pr_6O_{11})$ in a ratio of 1.5:1 (by weight) with a Rh loading of 10.71 $g/ft^3$.

Methods of Making Catalysts

Methods of Making $LnZrO_2$-based Catalysts

In yet another aspect, the present invention relates to methods of making the $Ln-ZrO_2$-based MMOSOs disclosed herein.

Washcoat and overcoats comprising $Ln-ZrO_2$-based MMOSOs can generally be made using the techniques exemplified in Example 2.

In addition, catalyst systems comprising $Ln-ZrO_2$-based MMOSOs, such as $Pr-ZrO_2$-based MMOSOs or $La-ZrO_2$-based MMOSOs, can be made as follows. For example, a catalyst system which comprises a substrate and washcoat can be generated by: a) depositing a washcoat comprising a $Ln-ZrO_2$-based MMOSO, an OSM and a metal catalyst on a substrate; and b) treating the washcoat and substrate by drying and calcination. Alternatively, a catalyst system which comprises a substrate and washcoat can be generated by: a) depositing a washcoat comprising a $Ln-ZrO_2$-based MMOSO and an OSM on a substrate; b) treating the washcoat and substrate by calcination; and c) impregnating a metal catalyst into the washcoat, followed by drying and calcination.

In some embodiments, the catalyst system comprises a substrate, a washcoat and an overcoat. Such catalyst systems can be generated by: a) depositing a washcoat comprising a $Ln-ZrO_2$-based MMOSO, an OSM and a metal catalyst on a substrate; b) treating the washcoat and substrate by calcination; c) depositing an overcoat onto the washcoat, wherein the overcoat comprises a support oxide, an OSM and a metal catalyst, followed by drying and calcination. Alternatively, the catalyst system can be generated by: a) depositing a washcoat comprising a $Ln-ZrO_2$-based MMOSO and an OSM on a substrate; b) treating the washcoat and substrate by calcination; c) impregnating a metal catalyst into the washcoat; d) depositing an overcoat onto the washcoat, wherein the overcoat comprises a support oxide, an OSM and a metal catalyst; and e) impregnating a metal catalyst into the overcoat, followed by drying and calcination. The same methods are suitable for generating catalyst systems wherein the washcoat comprises a support oxide, an OSM and a catalyst and the overcoat comprises a $Ln-ZrO_2$-based MMOSO, an OSM and a catalyst. In addition, the same methods can be used to generate catalyst systems wherein both the washcoat and overcoat comprise a $Ln-ZrO_2$-based MMOSO, an OSM and a catalyst.

In embodiments wherein the metal catalyst is mixed with the washcoat and/or overcoat (typically present as a slurry) or impregnated into an overcoat and/or washcoat, the metal catalyst may be added in the form of a nitrate, acetate or chloride salt. In embodiments wherein the metal catalyst is impregnated into an overcoat and/or washcoat, the metal catalyst may be impregnated as an aqueous solution.

Methods of Utilizing Catalysts of the Present Invention

Catalyst systems comprising the $Ln-ZrO_2$-based MMOSOs of the present invention, such as $Pr-ZrO_2$-based MMOSO or $La-ZrO_2$-based MMOSO, are useful for a variety of purposes. As discussed herein, the $Ln-ZrO_2$-based MMOSOs may be used in catalytic converter systems present in, for example, automobiles.

In some embodiments, catalyst systems comprising $Ln-ZrO_2$-based MMOSOs, such as $Pr-ZrO_2$-based MMOSO or $La-ZrO_2$-based MMOSO, are used to reduce toxic exhaust gas emissions. Accordingly, the present invention envisions a method of reducing toxic gas emissions comprising contacting the gas emissions with catalyst systems comprising $Ln-ZrO_2$-based MMOSOs. The present invention also refers to a method of reducing toxic gas emissions by utilizing catalyst systems comprising $Ln-ZrO_2$-based MMOSOs.

As discussed herein, catalyst systems comprising $Ln-ZrO_2$-based MMOSOs, such as $Pr-ZrO_2$-based MMOSO or $La-ZrO_2$-based MMOSO, exhibit increased oxygen flow when compared to catalyst systems comprising traditional support oxides. Thus, the present invention also refers to a method of increasing oxygen flow through a catalytic system by stabilizing the phase of the support oxide present in the system, preferably stabilizing the tetragonal phase. The tetragonal phase can be stabilized by using $Ln-ZrO_2$-based MMOSOs in catalyst systems.

Catalyst systems comprising $Ln-ZrO_2$-based MMOSOs, such as $Pr-ZrO_2$-based MMOSO or $La-ZrO_2$-based MMOSO, also exhibit improved catalyst lifetime—particularly Rh lifetime. Thus, the present invention contemplates methods of improving the lifetime of a catalyst system comprising a metal catalyst such as Rh by utilizing a washcoat, overcoat, or both comprising a $Ln-ZrO_2$-based MMOSO in a catalyst system. Such methods include: a) reducing the amount of metal catalyst deactivated during the aging of the catalyst system; b) increasing the amount of metallic catalyst (e.g., Rh(0)) initially present in the catalyst system; or c) both a) and b). In addition, such methods include: a) increasing the amount of Rh(0) and/or Rh(III) as $Rh_2O_3$ initially present in the catalyst system; or b) decreasing the amount of Rh(0) which is converted to Rh(III) as $Rh_2O_3$ or Rh(III)-MMO during aging of the catalyst system.

Catalyst systems comprising $Ln-ZrO_2$-based MMOSOs, such as $Pr-ZrO_2$-based MMOSO or $La-ZrO_2$-based MMOSO, can also be used in methods of improving TWC. For example, the present invention includes methods of improving TWC of gas emissions comprising contacting the gas emissions with catalyst systems comprising $Ln-ZrO_2$-based MMOSOs. The present invention also refers to methods of improving TWC of gas emissions by utilizing catalyst systems comprising $Ln-ZrO_2$-based MMOSOs.

These and other embodiments of the invention may be further illustrated in the following non-limiting Examples.

EXAMPLES

Example 1

Generation of Washcoats and Overcoats Comprising Traditional Support Oxides

The following is a representative protocol for the production of washcoats and overcoats comprising traditional support oxides. Such washcoats and overcoats can be used in combination with washcoats and overcoats comprising the Ln-$ZrO_2$-based MMOSOs of the present invention. The protocols in this Example represent standard techniques known in the art (see, for example, U.S. Pat. No. 7,641,875).

Traditional washcoats were generated as follows. A slurry comprising the OSM, alumina powder and lanthanide nitrate solution (commercially available as lanthanum nitrate product code 5248 from Molycorp, Inc., Mountain Pass, Calif.) in deionized water was generated. The slurry was then milled in a Szegvari Type IS Atrittor until the rheology was suitable for coating the support. A cordierite honeycomb support was dipped into the slurry. Excess slurry was blown from the support with an air jet. The support was dried in flowing air at room temperature, was heat-treated in air at about 150° C., and was calcined at 750° C. for 4 hours to yield a MPC composition.

Traditional overcoats were generated using the process described in Example 2, except that La—$Al_2O_3$ was used instead of 10% Pr—$ZrO_2$-based MMOSO.

Example 2

Generation of Overcoats Comprising Doped $ZrO_2$-Based MMOSOs

A 10% Pr—$ZrO_2$-based MMOSO overcoat was generated using the following procedure. This procedure can generally be used to generate overcoats containing Ln-$ZrO_2$-based MMOSOs.

A 10% Pr—$ZrO_2$-based MMOSO/$Ce_{0.3}Zr_{0.6}Nd_{0.05}Y_{0.05}O_2$ (OSM) (1.5:1 ratio) overcoat slurry containing 38% solid (by weight) was generated as follows. The appropriate amount of 10% Pr—$ZrO_2$, $Ce_{0.3}Zr_{0.6}Nd_{0.05}Y_{0.05}O_2$, and de-ionized water were weighed out in separate containers. The 10% Pr—$ZrO_2$ and $Ce_{0.3}Zr_{0.6}Nd_{0.05}Y_{0.05}O_2$ were weighed out in a 1.5:1 ratio. Acetic acid (0.5% relative to the solids) was weighed and then added to the de-ionized water container. The above reactants were then combined into an attrition-mill as follows: 1) 75-80% of the de-ionized water and acetic acid solution was added; 2) the 10% Pr—$ZrO_2$ and the $Ce_{0.3}Zr_{0.6}Nd_{0.05}Y_{0.05}O_2$ were added; 3) the remaining de-ionized water and acetic acid solution was added. The resulting slurry was then milled until homogenous. Once the 10% Pr—$ZrO_2$-based MMOSO/OSM slurry particle size reached d(50) 5±0.5 (4.5 target) micrometers, the milled slurry was dropped into a container and the final pH and % solids were recorded.

The resulting 10% Pr—$ZrO_2$-based MMOSO/$Ce_{0.3}Zr_{0.6}Nd_{0.05}Y_{0.05}O_2$ milled slurry was then metalized with Rh as follows. The milled slurry was mixed with a high shear mixer. The solid (%) content of the milled slurry was then measured in a moisture balance and the initial pH recorded. The appropriate amounts of 10% Pr—$ZrO_2$-based MMOSO/$Ce_{0.3}Zr_{0.6}Nd_{0.05}Y_{0.05}O_2$ milled slurry, $Rh(NO_3)_3$ solution, and de-ionized water were then measured in separate containers. To generate a concentration of 20 g/$ft^3$ Rh in the overcoat, an Rh slurry concentration of 1.177% (by weight) was required. Using the high sheer mixer, the $Rh(NO_3)_3$ solution was added to the 10% Pr—$ZrO_2$-based MMOSO/OSM milled slurry and mixed until homogenous. The pH of the resulting slurry was then recorded. The resulting slurry was adjusted to a pH of 6.4 using ammonium hydroxide. The previously weighed de-ionized water was then added to the metalized slurry and the pH was confirmed to remain at a pH of 6.4 (note that, if the pH was not at 6.4, it would have been adjusted to pH 6.4). The final viscosity range was 75-200 cp @ 60 rpm (generally, the target viscosity is 120 cp @ 60 rpm). The slurry was again mixed until homogenous and the final pH and % solids were recorded. The metalized slurry was then used to coat the appropriate substrate.

Figure 15:
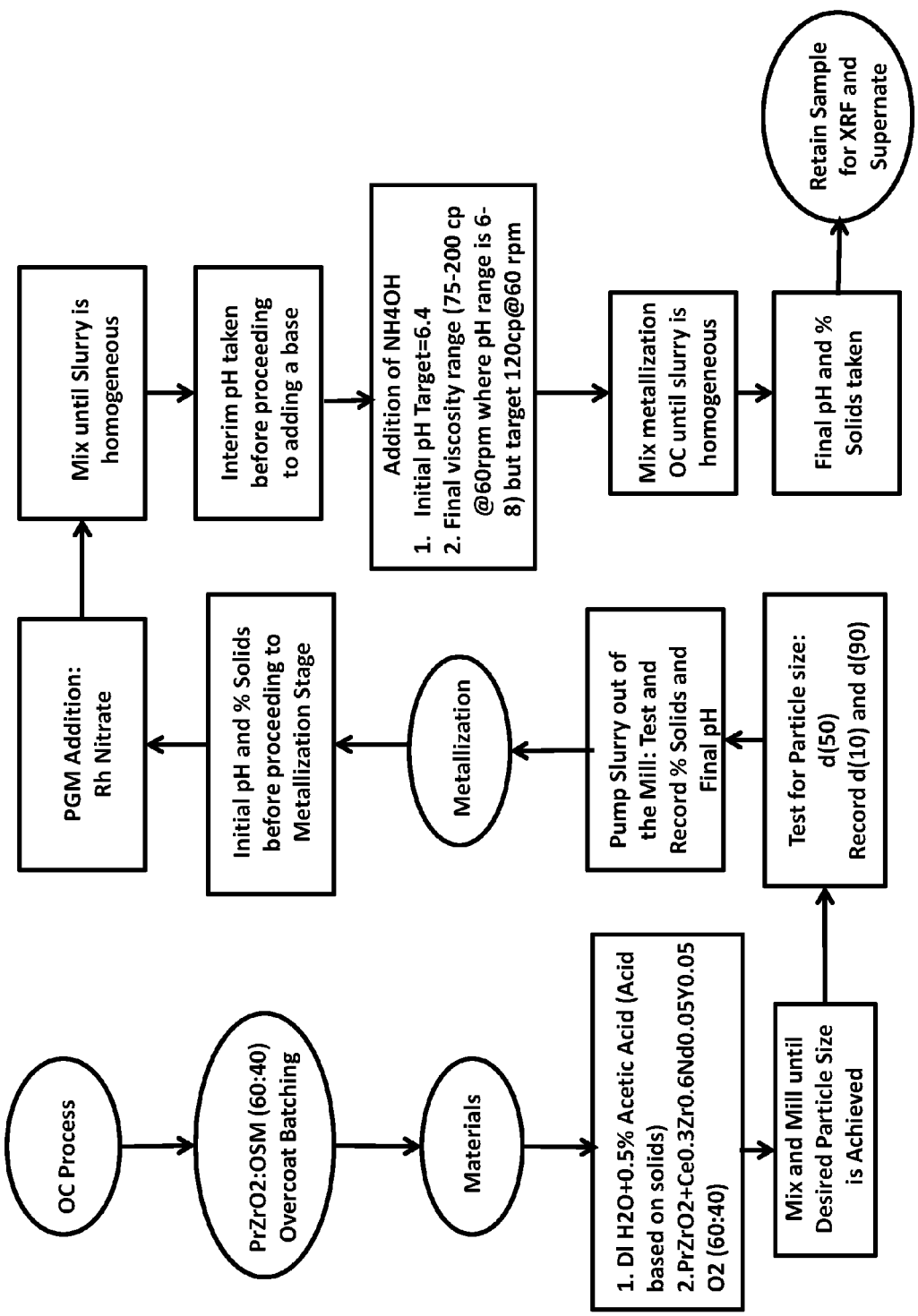
FIG. 15 is a flowchart illustrating the generation of an overcoat containing a Pr—$ZrO_2$-based MMOSO.

A schematic representation of the process is presented as FIG. 15.

Example 3

Evaluation of the Effect of Doped $ZrO_2$-Based MMOSOs on $NO_x$ Light-Off Temperature The performance of the TWC catalyst systems containing Ln-$ZrO_2$-based MMOSOs was evaluated by testing the catalysts on a synthetic gas flow reactor that closely simulates the engine-out gas chemistry and conditions (e.g., temperature) found in vehicles.

The catalyst systems containing 0.25% Rh (by weight) at a coating of oxide at 125 g/L were tested (see Table 1) on a washcoat comprising an OSM made by either the IWCP or HTP process. A representative procedure for making an OSM by the IWCP process is described in Example 10. A representative procedure for making an OSM by the HTP process is described in Example 11.

TABLE 1

| Catalyst System (oxide used) | Process | $NO_x$ T50 (° C.) |
|---|---|---|
| a) 10% La—$Al_2O_3$ | HTP | 284.8 |
| b) $Nd_{0.05}Pr_{0.05}Ce_{0.30}Zr_{0.60}O_2$ | HTP | 301.8 |
|  | IWCP | 292.4 |
| c) $La_{0.10}Zr_{0.90}O_2$ | HTP | 273.8 |
| d) $Pr_{0.10}Zr_{0.90}O_2$ | HTP | 274.7 |
|  | IWCP | 262.2 |

The catalyst formulations were aged by exposure to slightly rich exhaust for 20 hours at 1000° C. and a space velocity of 12,000 $hr^{-1}$. Temperature: 1000° C.; Duration: 20 hours. The effects of the Ln-$ZrO_2$-based MMOSOs on Rh catalytic performance in the TWC process were then evaluated. Table 1 demonstrates the effect that varied Ln-$ZrO_2$-based MMOSOs had on light-off temperatures after aging.

As can be seen from Table 1, Ln-doped $ZrO_2$ support oxides showed a significant decrease in light-off temperature compared to the traditional alumina-based support oxide.

Example 4

Evaluation of the Effect on $NO_x$ and Hydrocarbon Conversion of Ln-$ZrO_2$-Based MMOSOs The performance of TWC catalysts containing Ln-$ZrO_2$-based MMOSOs was also evaluated through vehicle testing.

Catalyst coatings were synthesized on conventional cordierite substrates and assembled into a system using a close-coupled catalyst (CC) and an underfloor (UF) catalyst. Each catalyst system had a one-liter volume capacity. The substrate contained 400 cells/in$^2$ and a wall thickness of 3.5 mm.

Each test system utilized the same washcoat containing Pd (concentration 100 g/ft$^3$ for both the CC and UF catalyst) and La—Al$_2$O$_3$ as a support oxide.

In addition, each test system utilized Rh in the overcoat (concentration 20 g/ft$^3$ for the CC catalyst and 8.3 g/ft$^3$ for the UF catalyst). However, the support oxide of the overcoat was varied to enable a direct comparison of the effects of the support oxide on Rh function in the catalyst systems. Testing focused on performance after accelerated engine aging cycles that have been established to simulate in-use vehicle aging approximating 150,000 miles of driving. The aging cycle comprised exposing the catalyst systems to 950° C. for 200 hrs. Two different controlled drive cycles were used to measure the tailpipe emissions: a) the Federal Test Procedure (see Table 2); and b) the high-speed cycle known as the US06 (see Table 3).

TABLE 2

Federal Test Procedure TWC Vehicle Performance With Three Overcoat Compositions.

| | Overcoat Composition | Federal Test Procedure Tailpipe Emissions | |
|---|---|---|---|
| | | NO$_x$ (g/mile) | Non-Methane HC (g/mile) |
| Standard | 40% OSM/60% La—Al$_2$O$_3$ | 0.010 | 0.0067 |
| Doping | 40% OSM/30% La—Al$_2$O$_3$/ 30% Pr$_{0.10}$Zr$_{0.90}$O$_2$ | 0.0085 | 0.0065 |
| | 40% OSM/ 60% Pr$_{0.10}$Zr$_{0.90}$O$_2$ | 0.0088 | 0.0066 |

TABLE 3

US06 TWC vehicle Performance With Three Overcoat Compositions

| | Overcoat Composition | US06 Tailpipe Emissions | |
|---|---|---|---|
| | | NO$_x$ (g/mile) | Non-Methane HC (g/mile) |
| Standard | 40% OSM/60% Al$_2$O$_3$ | 0.018 | 0.042 |
| Doping | 40% OSM/30% Al$_2$O$_3$/ 30% Pr$_{0.10}$Zr$_{0.90}$O$_2$ | 0.019 | 0.038 |
| | 40% OSM/ 60% Pr$_{0.10}$Zr$_{0.90}$O$_2$ | 0.011 | 0.034 |

The data from Table 2 shows the significant reduction in NO$_x$ emissions with catalyst systems comprising Pr$_{0.10}$Zr$_{0.90}$O$_2$ support oxides. Table 3 shows that the decrease of NO$_x$ emissions is even more significant in the case of the high-speed, high-temperature US06 cycle for the full substitution case. Table 3 also shows a significant reduction in hydrocarbon emissions with catalyst systems comprising Pr$_{0.10}$Zr$_{0.90}$O$_2$ support oxides.

Example 5

Evaluation of the Effect on Rh State of Ln-ZrO$_2$-Based MMOSOs Using X-Ray Photoelectron Spectroscopy As discussed herein, the ability of the Rh catalyst to participate in the catalytic cycle depends on the state of Rh—i.e., Rh(0) vs Rh(III) as Rh$_2$O$_3$ vs Rh(III)-MMO. X-ray Photoelectron Spectroscopy (XPS) was used to assess the relative proportion of these three Rh states in fresh (as-made) and aged TWC catalyst systems comprising different Ln-ZrO$_2$-based MMOSOs. The XPS technique measures changes in binding energy of the Rh 3d electrons. Changes in oxidation state of Rh have a significant effect on binding energy—thus, shifts in binding energy can be assigned to changes in Rh oxidation state. The chemical environment of the Rh can also have a major impact on binding energy. For example, a higher binding energy is indicative of a Rh interaction with the support oxide—i.e., it is an indication that Rh(0) has interacted with the support oxide so as to form either Rh(III) as Rh$_2$O$_3$ or Rh(III)-MMO.

Detailed XPS scans were conducted on a Kratos Axis Ultra XPS system with an Al(mono) X-Ray source with the following characteristics: @ 270 W; Pass energy=20 eV; Step: 0.05 eV; Dwell time: 0.3 Second; Sweep: 5 times; Binding energy: 318-298 eV; Charge neutralizer: On.

Supported Rh systems were calibrated using the corresponding support and carbon tape (e.g. Zr 2p, O 1s and C 1s). A Rh metal film was used as a reference to verify the calibration (Rh Foil (0.25 mm thickness, 99.9%, Aldrich) and a Rh$_2$O$_3$ oxide was used on the XPS system for the oxide reference (Rh$_2$O$_3$; Powder, 99.8%, Aldrich).

The standard catalyst system tested was 5% Rh (by weight) on 10% La—Al$_2$O$_3$. The Rh levels present in the standard catalysts were compared to catalyst systems comprising 5% Rh (by weight) on Pr$_{0.10}$Zr$_{0.90}$O$_2$ MMOSOs.

The test samples were evaluated as follows:
1. After a 2% H$_2$ treatment for 1 hour at 150° C., all samples were cooled to room temperature in the 2% H$_2$ gas flow. The samples where then immediately transferred into a glove bag with 10% H$_2$—Ar.
2. In the glove bag filled with 10% H$_2$—Ar, the samples were sealed in a gas-tight XPS sample holder.
3. The XPS sample holder was transferred into the preparation chamber of the analyzer and held until the pressure was lower than 1.0×10$^{-6}$ ton before transfer to the XPS chamber for measurement.

TABLE 4

XPS Data Showing Relative Proportions of Rh Forms Present (Based on Oxidation States) in La—Al$_2$O$_3$ and Pr—ZrO$_2$ MMOSO Compositions

| | Catalyst system | % Rh (0) | % Rh (III) (Rh$_2$O$_3$) | % Rh (III) (Rh-M-Ox mixed oxide) |
|---|---|---|---|---|
| Standard | Fresh Rh/La—Al$_2$O$_3$ | 52 | 43 | 5 |
| | Aged Rh/La—Al$_2$O$_3$ | 42 | 7 | 42 |
| Doping | Fresh Rh/Pr$_{0.10}$Zr$_{0.90}$O$_2$ MMOSO | 78 | 22 | 0 |
| | Aged Rh/Pr$_{0.10}$Zr$_{0.90}$O$_2$ MMOSO | 68 | 32 | 0 |

The relative proportions of Rh forms present in the catalyst systems were measured: a) after freshly preparing the catalysts; and b) after 20 hours of aging at 900° C. The data from Table 4 demonstrates several benefits of Rh/Pr—ZrO$_2$-based MMOSO catalysts when compared to their Rh/La—Al$_2$O$_3$ counterparts. First, TWC catalyst systems comprising Rh/Pr—ZrO$_2$-based MMOSOs contain higher amounts of Rh(0) when compared to TWC catalyst systems comprising La—Al$_2$O$_3$. Specifically, when compared to catalysts containing Rh/La—Al$_2$O$_3$, Rh/Pr—ZrO$_2$-based MMOSO catalysts contain higher amounts of Rh(0) when they are initially formed, and these catalysts are better able to maintain Rh(0)

during the aging process. In addition, when TWC catalyst systems comprising Rh/Pr—$ZrO_2$-based MMOSOs are aged, they are able to retain essentially all the Rh as either Rh(0) or Rh(III) as reversible $Rh_2O_3$. Interestingly, not only is the vast majority of Rh present in the Rh/Pr—$ZrO_2$-based MMOSO compositions maintained as Rh(0) (Rh(0):Rh(III) as $Rh_2O_3$=68:32), but the relative population of Rh(0):Rh(III) as $Rh_2O_3$ is only moderately impacted by the aging process. However, when catalysts comprising Rh/La—$Al_2O_3$ are exposed to the same aging process, both the Rh(0) and Rh(III) as reversible $Rh_2O_3$ initially present in the composition are converted to the inactive and irreversibly oxidized Rh(III)-MMO state in significant quantities. Note that none of the inactive and irreversible Rh(III)-MMO state was observed in either the fresh or aged Rh/Pr—$ZrO_2$-based MMOSO catalysts.

Example 6

Evaluation of the Effect on Catalyst Efficiency of Pr Doping of $ZrO_2$-Based MMOSOs The effect of the amount of Pr doping of the $ZrO_2$-based MMOSO on catalyst efficiency was evaluated. In each of these experiments, the same catalyst was used (single layer of 13 g/ft$^3$ Rh) while the Pr content of the Pr—$ZrO_2$-based MMOSO was varied. Specifically, the effect of Pr doping on the T90 temperature was evaluated. The T90 temperature is the temperature at which the catalyst is capable of converting 90% of the passing exhaust compound (e.g., $NO_x$ or hydrocarbon) after the catalyst has been aged at 1000° C. for 10 hours.

TABLE 5

Efficiency of Catalyst systems Comprising Pr—$ZrO_2$-based MMOSOs

| | Catalyst system | NO T90 | HC T90 |
|---|---|---|---|
| Standard | Support oxide: 40% OSM/ 60% $Al_2O_3$ | 375.0 | 401.5 |
| 40% OSM/60% $Pr_xZr_{1-x}O_2$ | X = 0.05 | 367.2 | 387.8 |
| | X = 0.10 | 360.1 | 385.1 |
| | X = 0.15 | 357.1 | 388.1 |

The data from Table 5 show that catalyst systems comprising Pr—$ZrO_2$-based MMOSO exhibit lower light-off temperatures with respect to NO and hydrocarbon conversion. Thus, catalyst systems comprising Pr—$ZrO_2$-based MMOSOs are able to operate efficiently at lower temperatures when compared to the relative to a reference alumina catalyst.

Example 7

Evaluation of Amount of Reducible Rh in Ln-$ZrO_2$-Based MMOSOs Using Hydrogen Temperature-Programmed Reduction and Hydrogen Chemisorption Hydrogen Temperature-Programmed Reduction ($H_2$-TRP) and Hydrogen Chemisorption were used to evaluate the amount of reducible Rh (i.e., R(0) or Rh(III) as $Rh_2O_3$) present in Ln-$ZrO_2$-based MMOSOs.

Samples were tested as follows using an AutoChem II 2920.

$H_2$-TPR Portion of Testing

1) Samples were exposed to a carrier gas (i.e., an atmosphere) of 20% $O_2$—Ar. The temperature was raised at a rate of 20° C./min to a final temperature of 300° C. The temperature was maintained at 300° C. for 1 hour.
2) Samples were cooled to 40° C. in 20% $O_2$—Ar.
3) The carrier gas was changed to 100% Ar and the sample was maintained until the thermal conductivity detector (TCD) signal stabilized.
4) The samples were cooled to −50° C. in Ar. The temperature was maintained for 5 minutes.
5) The carrier gas was change to 10% $H_2$—Ar and maintained at −50° C. for 15 minutes.
6) TPR was carried out in 10% $H_2$—Ar, wherein the temperature was increased from −50° C. to 550° C. at a rate of 20° C./min. The temperature was then maintained at 550° C. for 30 minutes.

$H_2$-Chemisorption Portion of Testing

7) Post TPR, the carrier gas was changed to Ar and the temperature was maintained at 550° C. for 30 minutes.
8) The temperature was then reduced to 40° C. (with Ar as the carrier gas).
9) The temperature was further cooled to −70° C. in Ar and maintained until the TCD signal stabilized.
10) Chemisorption was carried out wherein 10% $H_2$—Ar Pulses were administered until saturation at −70° C. in Ar was observed.

The TPO protocol consisted of exposing the catalyst to oxygen at the stated temperature. The XHFC protocol consisted of high-temperature aging at the stated temperature in a fuel-cut gas chemistry (56 seconds stoichiometric, 4 s A/F=20) at a space velocity of 100,000 hr$^{-1}$.

The results of the testing are listed in Table 6.

TABLE 6

Rh Properties After $H_2$-chemisorption

| Sample | Type of Testing | Reducible Rh Surface Area (m$^2$/g Rh) | Rh Dispersion (H/Rh, %) | Avg. Rh Particle Size* (nm) |
|---|---|---|---|---|
| 0.6% Rh/$ZrO_2$ | 550° C. TPO | 182 | 41.3% | 2.66 |
| | 900° C. TPO | 104 | 23.7% | 4.64 |
| | 1000° C. XHFC (20 hours) | 1.20 | 0.27% | 403 |
| 0.6% Rh/ $Pr_{0.5}Zr_{0.95}O_2$ MMOSO | 550° C. TPO | 204 | 46.4% | 2.37 |
| | 900° C. TPO | 122 | 27.7% | 3.96 |
| | 1000° C. XHFC (20 hours) | 6.98 | 1.59% | 69.3 |
| 0.6% Rh/ $Pr_{0.10}Zr_{0.90}O_2$ MMOSO | 550° C. TPO | 242 | 55.0% | 2.00 |
| | 900° C. TPO | 130 | 29.4% | 3.73 |
| | 1000° C. XHFC (20 hours) | 12.6 | 2.87% | 38.3 |
| 0.6% Rh/ $Pr_{0.15}Zr_{0.85}O_2$ MMOSO | 550° C. TPO | 236 | 53.5% | 2.05 |
| | 900° C. TPO | 110 | 25.1% | 4.38 |
| | 1000° C. XHFC (20 hours) | 13.0 | 2.95% | 37.3 |

*Calculated based on complete Rh reduction

The results of the above testing are illustrated in FIGS. 10-14. As can be seen by the data in those Figures, on the whole, catalyst systems comprising $Pr_{0.10}Zr_{0.90}O_2$ MMOSO (10% Pr) as an Rh support exhibited the highest total $H_2$ absorption capacity. This suggests that such systems exhibit good oxygen storage capacity and good surface-redox active properties. In addition, increasing the Pr-content increased stability against Rh sintering. Moreover, the $Pr_{0.10}Zr_{0.90}O_2$ MMOSO (10% Pr) samples contained nearly twice the amount of $H_2$ accessible Rh surface after XHFC aging compared to the $Pr_{0.10}Zr_{0.90}O_2$ MMOSO (5% Pr) samples.

Example 8

Effect of Pr Doping of $ZrO_2$-Based MMOSOs on Catalyst Structure

The effect of the amount of Pr doping of the $ZrO_2$-based MMOSO on the overall structure of the washcoats or overcoats in which they are located was also tested. X-ray diffraction (XRD) was used to determine the amount of tetragonal vs monoclinic phase present in catalyst systems comprising various amounts of Pr doped onto $ZrO_2$-based MMOSO. The results are displayed in FIGS. 5 and 6.

XRD data was recorded on a Rigaku Mini Flex with accelerating voltage=30 kV; electron beam current=15 mA; dwell time=1.2 seconds; scan increment=0.02° 2Θ; with diffractometer optics: nickel filter on detector; $K_{\alpha 2}$ striping; and a scan range=10-70° 2Θ.

Increasing the amount of Pr doping above 5% lead to an increase in the stability of the tetragonal phase. This phenomenon is beneficial because the tetragonal phase of $ZrO_2$ is arranged in a manner which permits faster and easier diffusion of oxygen (i.e., oxygen motility) through the catalyst structure enhancing the activity of the catalyst. In addition, Pr present in the Ln-$ZrO_2$-based MMOSO is present as solid solution and, thus, the MMOSO is composed of a single homogenous phase. This also allows for faster and easier diffusion of oxygen through the catalyst structure (see FIGS. 7 and 8).

Figure 7:
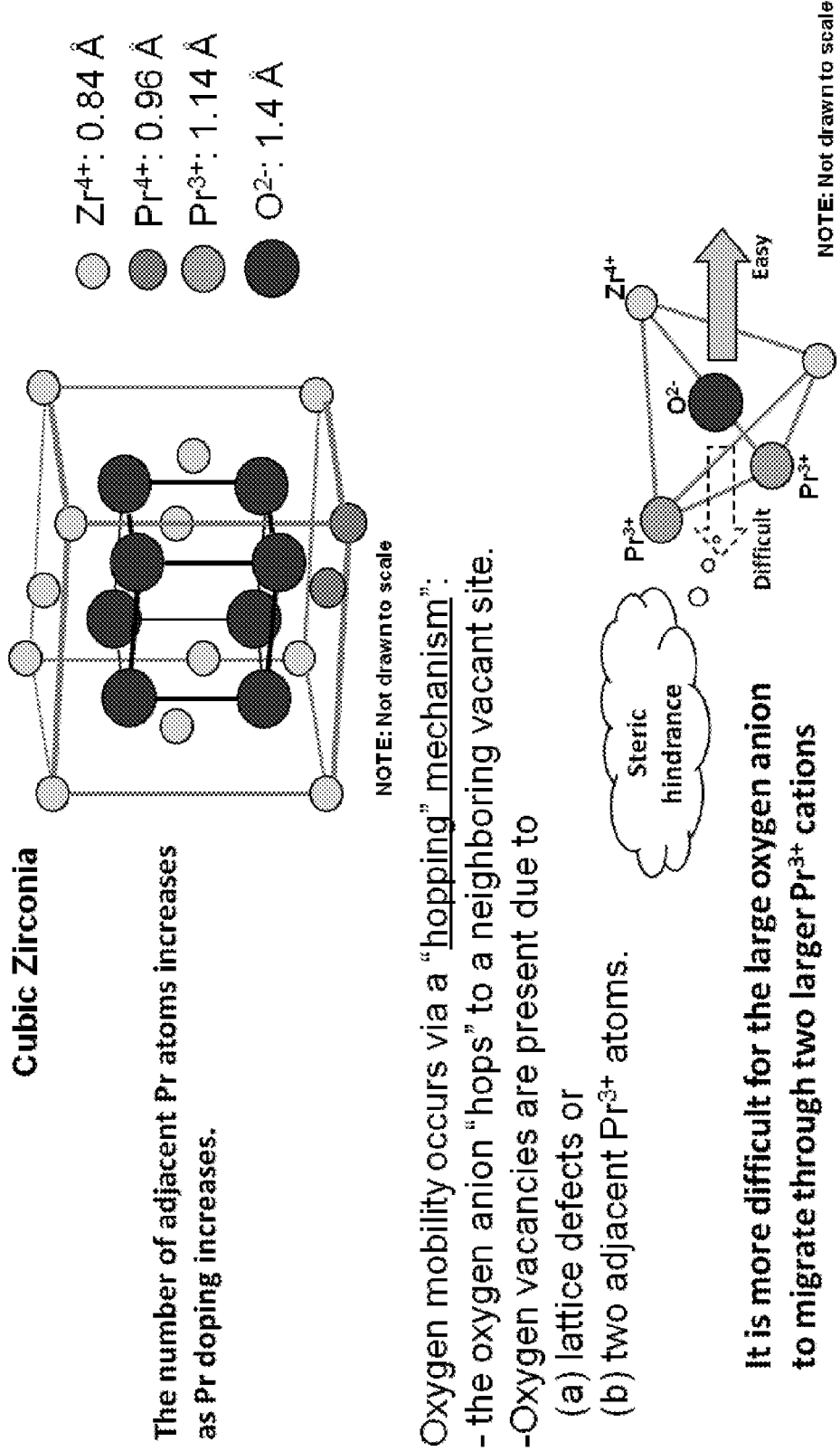
FIG. 7 is a diagram illustrating the steric hindrance presented by $Pr^{3+}$ cations. Oxygen mobility occurs via a "hopping" mechanism. That is, the oxygen anion "hops" to a neighboring vacant site which is usually present due to lattice defects or the fact that two $Pr^{3+}$ atoms are adjacent to each other. The presence of too many $Pr^{3+}$ cations makes it difficult for relatively large oxygen anion to migrate through the lattice.
Figure 8:
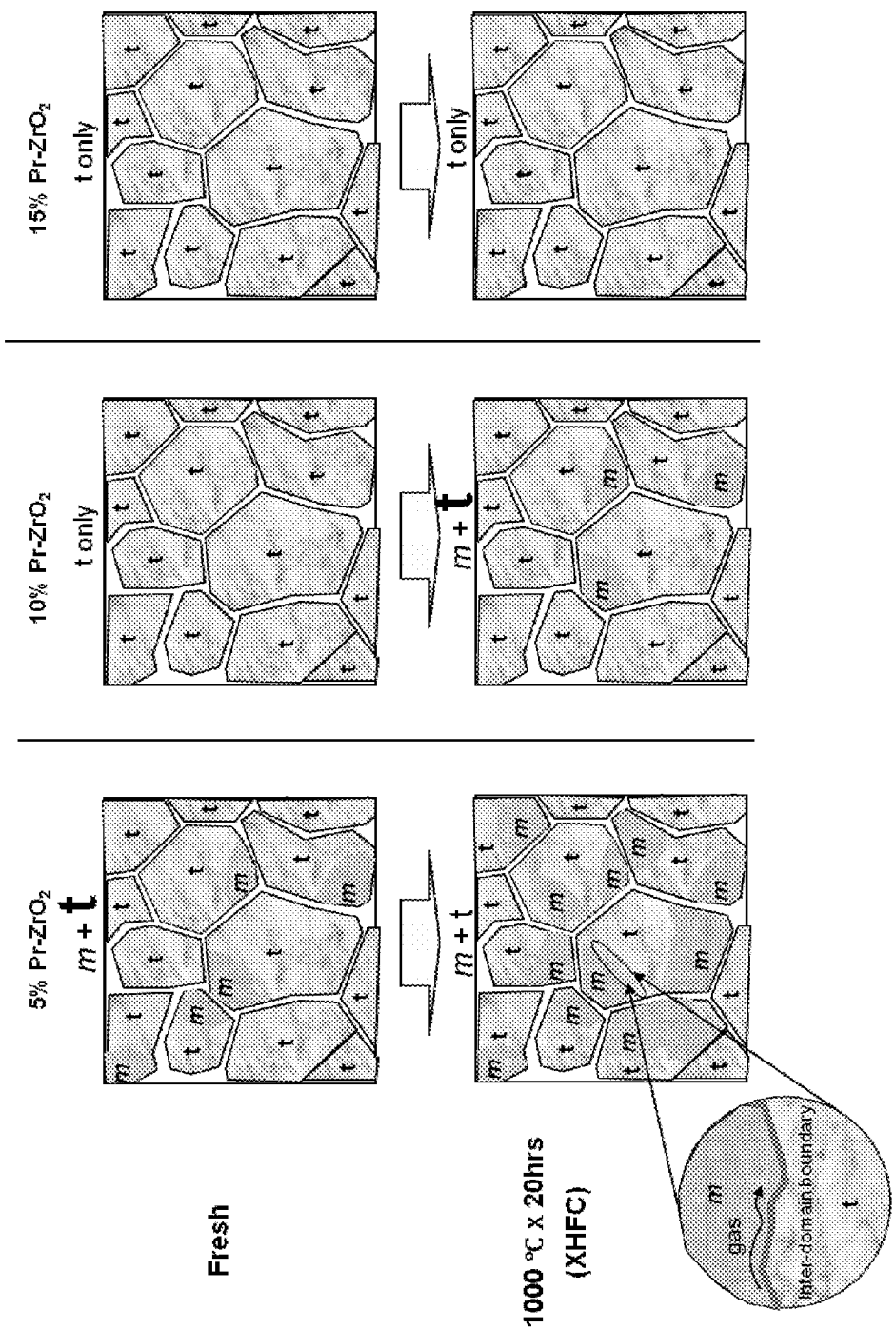
FIG. 8 is a diagram illustrating that the inter-domain boundary between monoclinic and tetragonal facilitates gas diffusion and plays a role as a gas diffusion pathway. Thus, stabilization of the tetragonal phase by Pr doping leads to faster and easier diffusion of oxygen through the catalyst structure.
Figure 9:
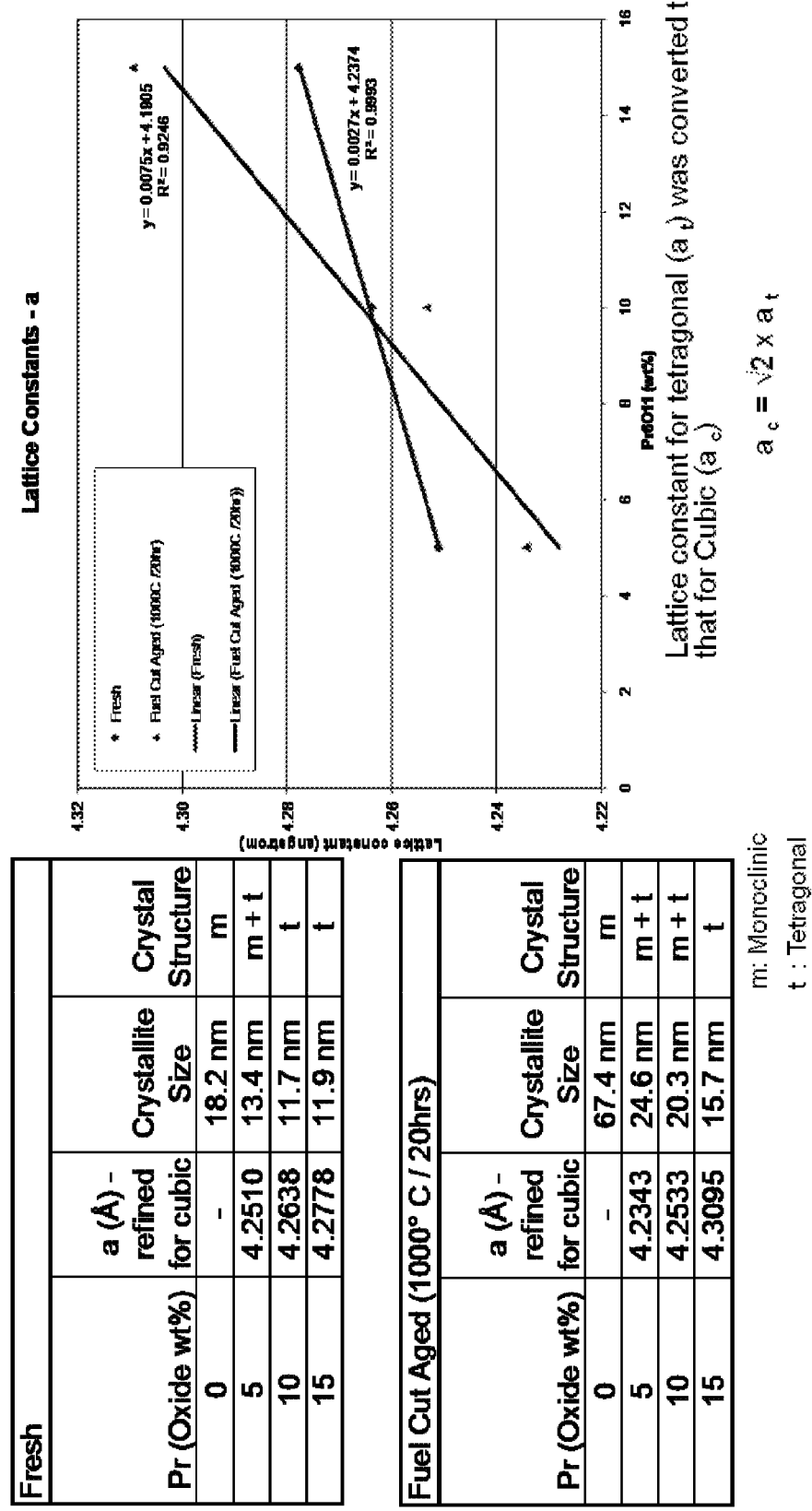
FIG. 9 is a plot of lattice parameter versus Pr content of the MMOSO. The data indicate a linear relationship between the amount of Pr introduced into the support oxide and the lattice parameters. The fact that Pr affects the lattice parameters in this respect signifies that a solid solution exists between Pr and Zr rather separate phases.
Figure 10:
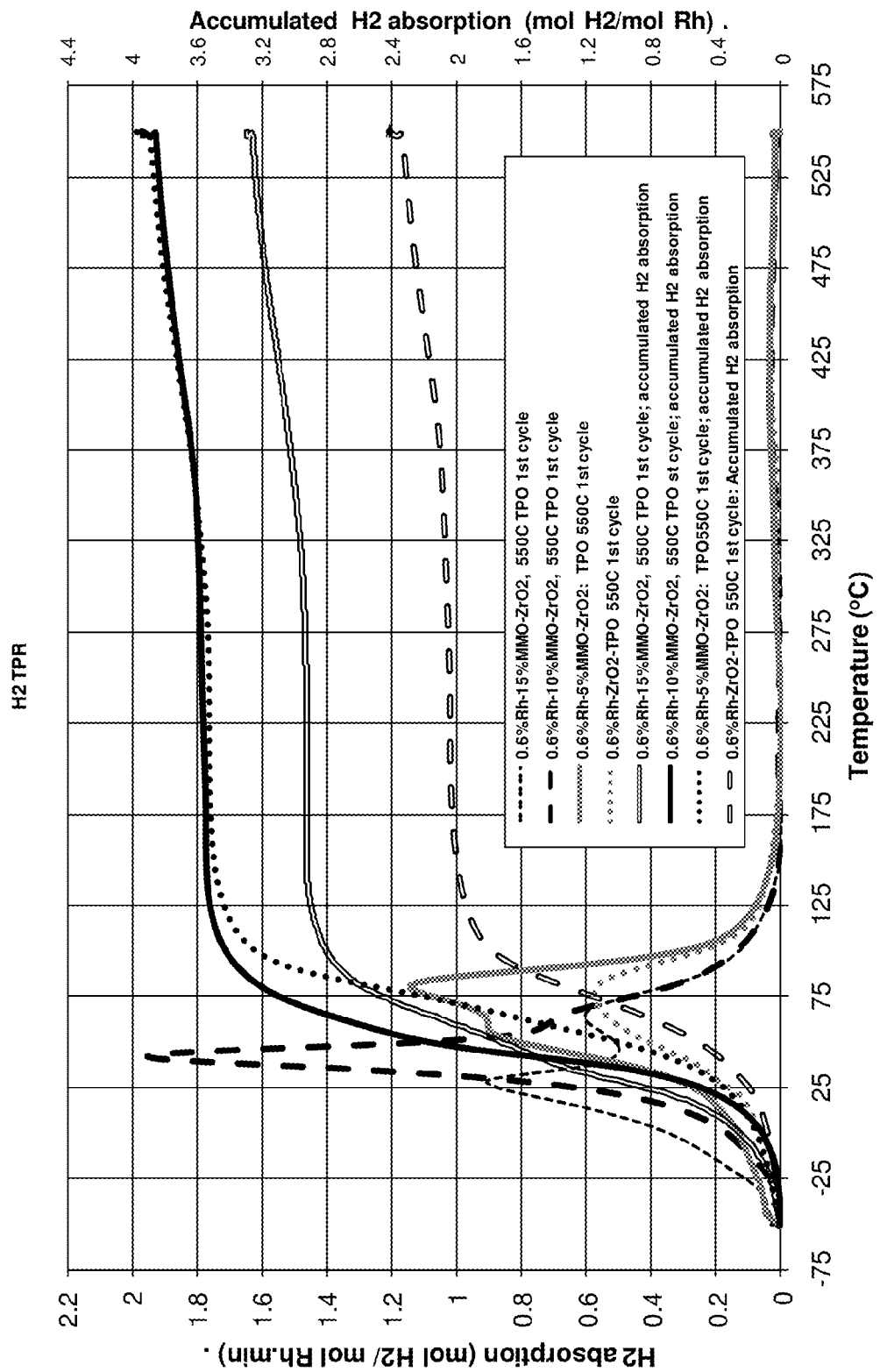
FIG. 10 is a plot of the rate of $H_2$ absorption and of cumulative hydrogen absorption vs temperature for the 550° C. TPO-TPR cycle. As the amount of Pr increased, the major Rh and Rh-MMO reduction peaks (A+B) shifted to lower temperatures, indicating lower light-off temperatures. It is noted that the 5% Pr and 10% Pr loaded samples had the highest total $H_2$ absorption.
Figure 11:
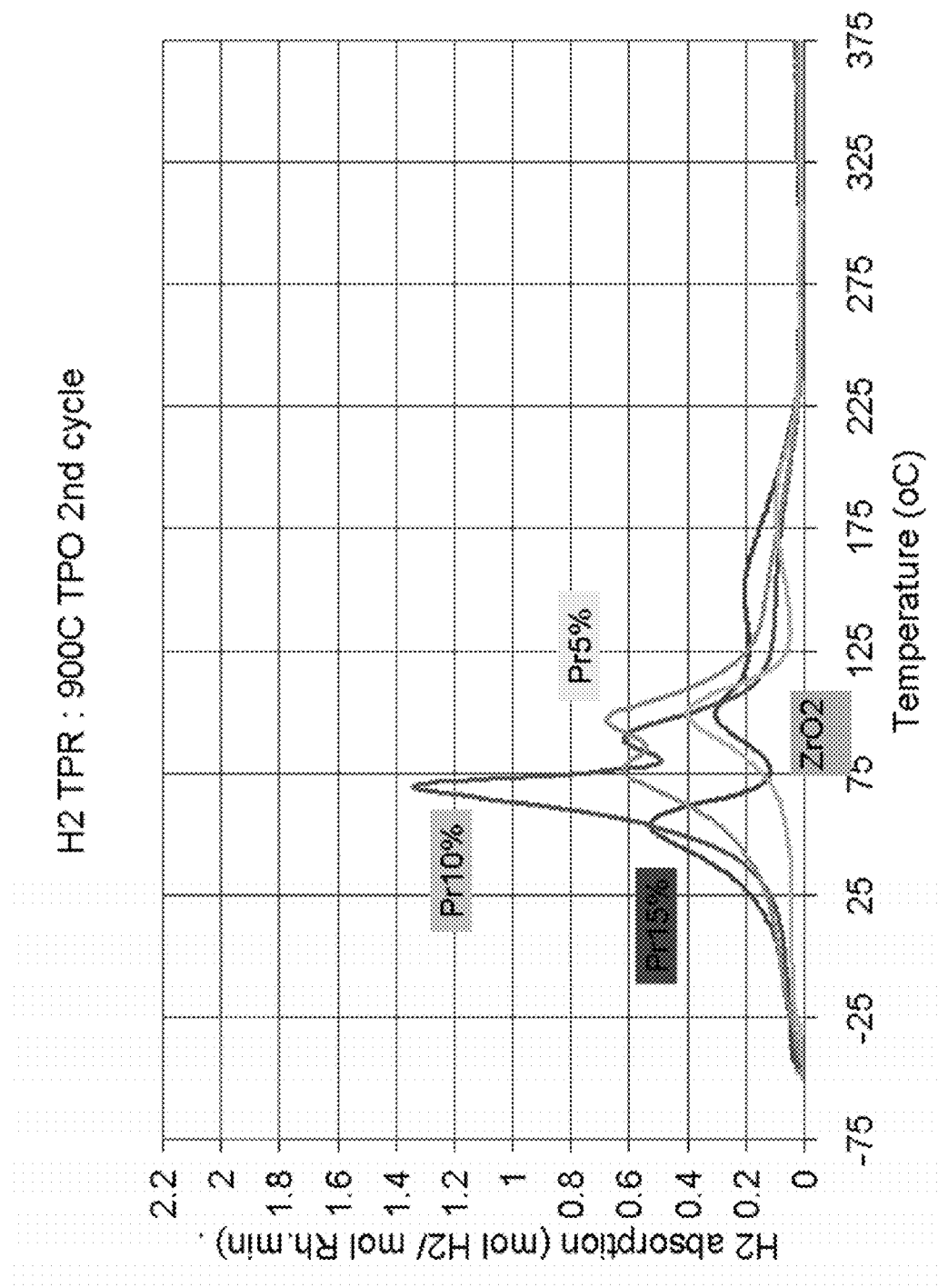
FIG. 11 is a plot of the rate of $H_2$ absorption vs temperature for the 900° C. TPO-TPR cycle. The 10% Pr loaded sample exhibited the highest total $H_2$ absorption.
Figure 12:
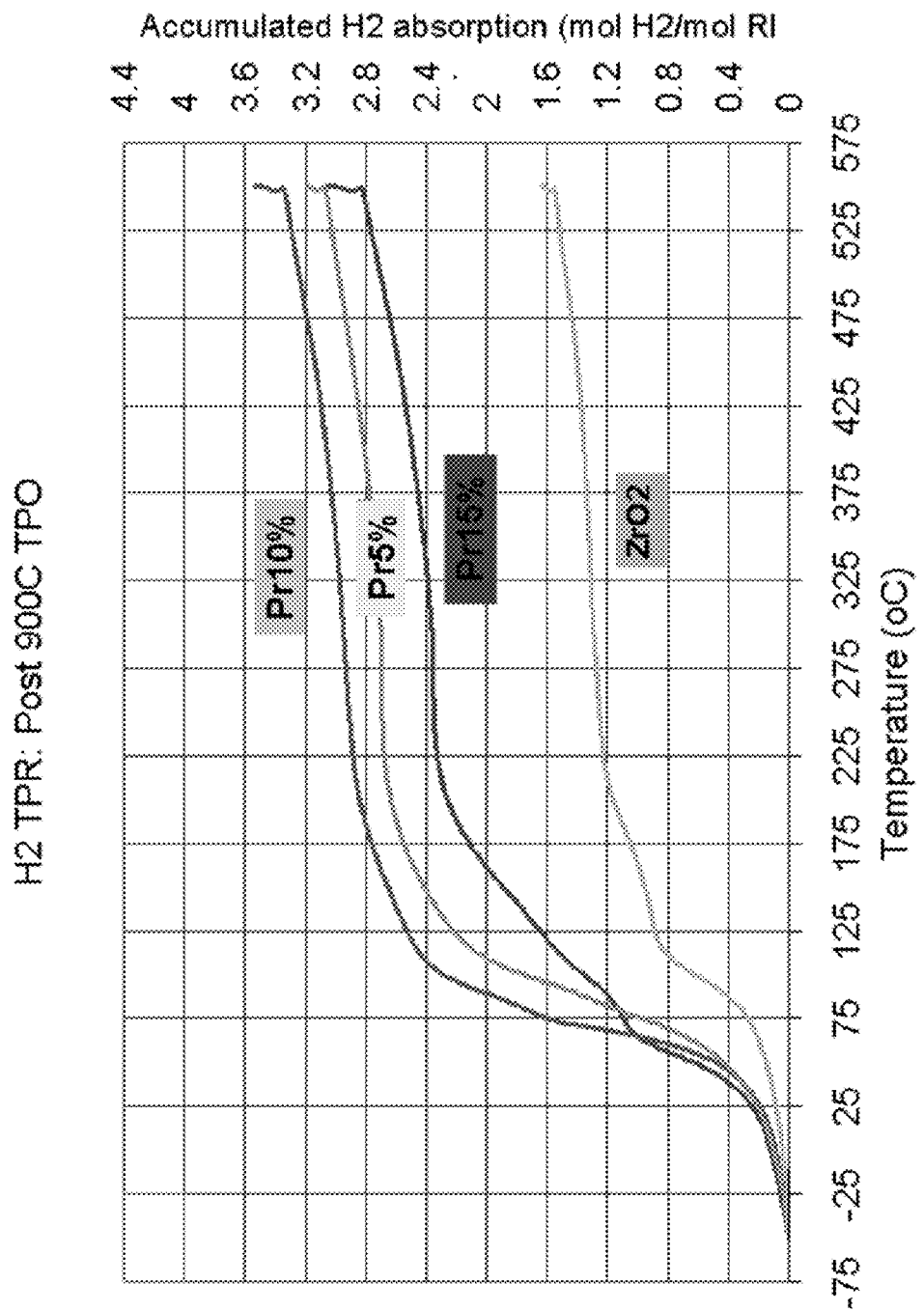
FIG. 12 is a plot of cumulative $H_2$ absorption vs temperature for the 900° C. TPO-TPR cycle. The 10% Pr loaded sample exhibited the highest total $H_2$ absorption.
Figure 13:
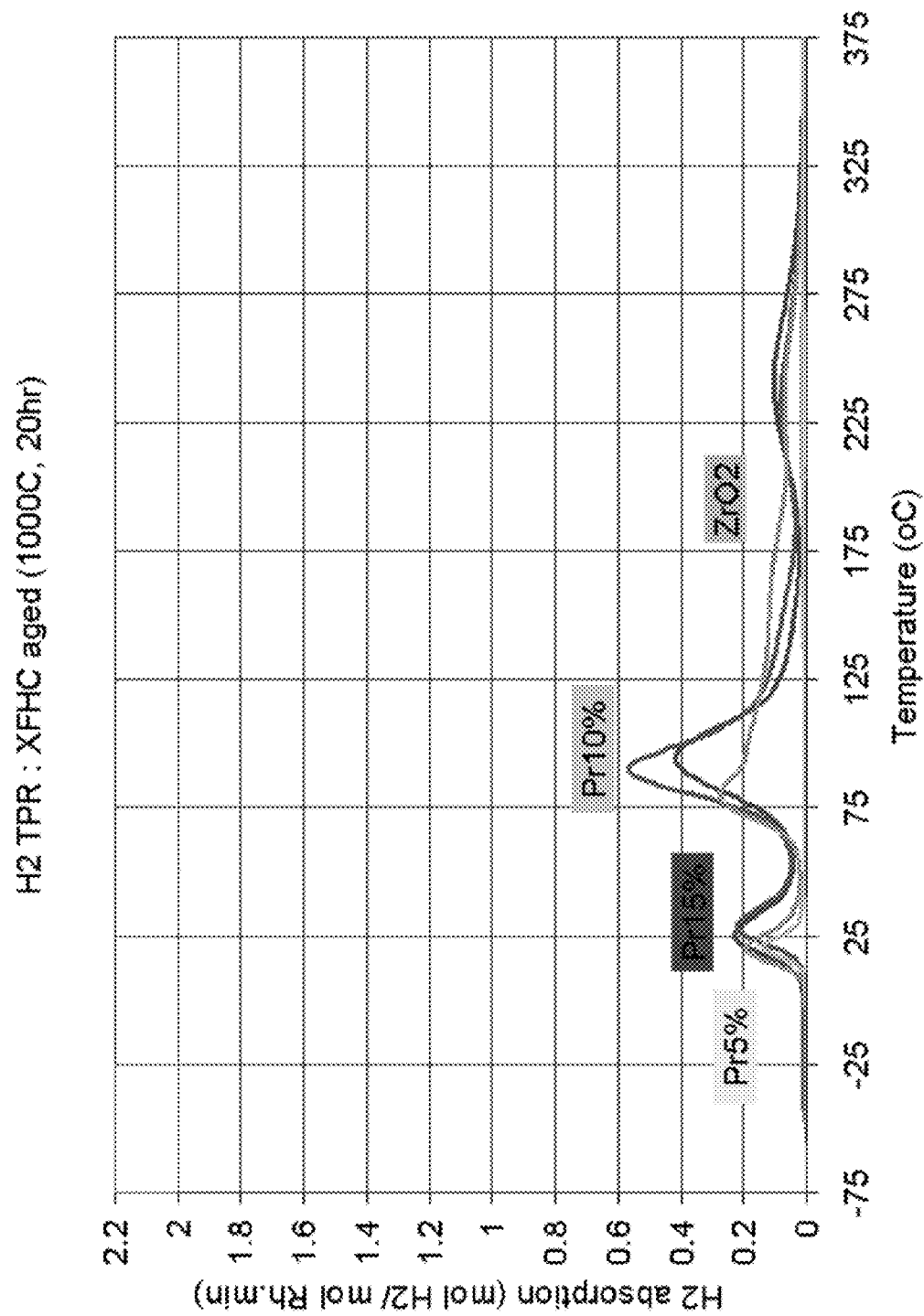
FIG. 13 is a plot of the rate of $H_2$ absorption vs temperature for the 1000° C. XHFC aging. At 25° C., $H_2$ absorption can be ranked as follows: (15% Pr)=(10% Pr)>(5% Pr)>(0% Pr). The 10% Pr loaded sample had the highest total $H_2$ absorption.
Figure 14:
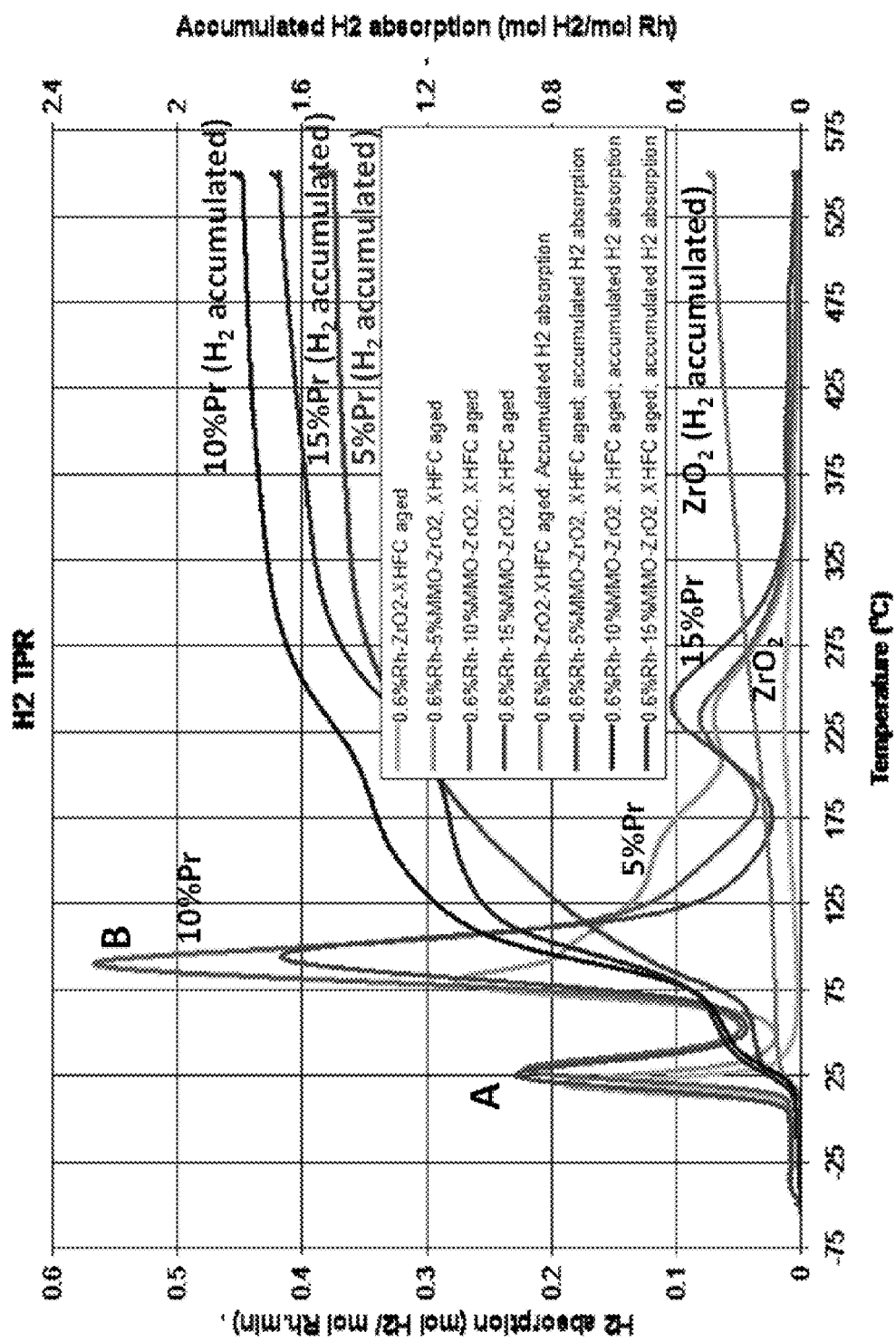
FIG. 14 is a plot of the rate of $H_2$ absorption and of cumulative hydrogen absorption versus temperature for the 1000° C. XHFC aging. At 25° C., $H_2$ absorption can be ranked as follows: (15% Pr)=(10% Pr)>(5% Pr)>(0% Pr). The 10% Pr loaded sample had the highest total $H_2$ absorption.

When considering phase stability and $H_2$ absorption capacity, 10% Pr doping yields optimal catalyst properties. As discussed above, increasing doping above 10% means that a large amount of larger $Pr^{3+}$ cations (when compared to the $Zr^{4+}$ cations) are present in the catalyst system. The $Pr^{3+}$ cations may act as steric barriers to oxygen diffusion as the amount of Pr increases. This phenomenon is illustrated in FIG. 7.

Example 9

Effect of Pr Doping of $ZrO_2$-Based MMOSOs on Oxygen Storage Capacity

The effect of the amount of Pr doping of the $ZrO_2$-based MMOSO on the oxygen storage capacity (OSC) of washcoats containing Pr—$ZrO_2$-based MMOSOs was evaluated. OSC is typically measured by exposing a sample to either lean or rich air/fuel mixtures. In such environments, the sample must either absorb $O_2$ from the exhaust stream (e.g., in lean air/fuel mixture environments) or release $O_2$ (e.g., in rich air/fuel mixture environments) in order to maintain efficient catalysis of exhaust compounds. The amount of time for which a sample can buffer the lean/rich air/fuel mixture is one way to quantify the OSC of a sample. This time is usually referred to as the "delay time"—i.e., the amount of time that it takes for a perturbation in the air/fuel mixture to manifest itself as a change in $O_2$ levels within the catalyst environment. The delay time can also be measured by the amount of time that it takes for a perturbation in the air/fuel mixture to manifest itself as a change in CO levels within the catalyst environment. Thus, the longer the delay time, the better the OSC of a sample.

As can be seen by the data in Table 7, increasing the amount of Pr present in the MMOSOs has a positive effect on the OSC of the washcoat. The washcoat comprised: 120 g/L, 9.6M Ba Impregnation (12 g/ft³ Pd); OSM:support oxide (1:1.5) (12.7 g/ft³ Rh).

TABLE 7

| OSC of Pr—$ZrO_2$-based MMOSOs | | |
|---|---|---|
| Support Oxide in Washcoat | $O_2$ delay time at 575° C. (seconds) | CO delay time at 575° C. (seconds) |
| $ZrO_2$ | 16.52 | 9.98 |
| 5% Pr—$ZrO_2$ | 15.52 | 7.92 |
| 10% Pr—$ZrO_2$ | 20.02 | 12.17 |
| 15% Pr—$ZrO_2$ | 20.29 | 13.47 |

Example 10

Generation of OSM Using the Improved Wet Chemical Process (IWCP)

In a representative IWCP procedure, $Pd(NO_3)_2$ was added to an aqueous slurry of milled OSM (30% $CeO_2$, 60% $ZrO_2$, 5% $Nd_2O_3$ and 5% $Pr_6O_{11}$). Tetraethylammonium hydroxide was then added to generate the IWCP-OSM slurry.

Separately, La—$Al_2O_3$ was milled with acetic acid at a pH of ~6.0. $BaCO_3$ was then added to the milled La—$Al_2O_3$ and stirred for approximately 5 minutes. The La—$Al_2O_3$/$BaCO_3$ mixture was then added to IWCP-OSM slurry and the resulting composition was coated on to the washcoat which was calcined to generate the Pd-OSM IWCP containing catalyst composition (see, FIG. 16).

Example 11

Generation of OSM Using the High Temperature Process (HTP)

Oxygen storage materials generated using the High Temperature Process (HTP) contain a metal catalyst (e.g., Pd) in a solid solution with the OSM (in this case a Ce-containing mixed metal oxide). Thus, OSMs generated using the HTP contain a metal catalyst which is evenly dispersed throughout the OSM and the surface of the OSM.

The HTP entails first mixing a Pd chemical precursor and an oxide OSM, and then spraying the mixture into a hot furnace. Typically, the temperature of the furnace is between 300° C. and 500° C. and the temperature of the hot zone of the furnace is greater than 500° C. In a representative experiment, the HTP OSM was generated by 1) co-milling (30% $CeO_2$, 60% $ZrO_2$, 5% $Nd_2O_3$ and 5% $Pr_6O_{11}$) and a $Pd(NO_3)_2$; and 2) spraying the resulting mixture of into a furnace.

What is claimed is:

1. A catalyst system comprising an overcoat, wherein said overcoat comprises an oxygen storage material (OSM) and a support oxide in a 1.5:1 ratio (by weight), wherein:
    said OSM is 30% $CeO_2$, 60% $ZrO_2$, 5% $Nd_2O_3$, and 5% $Pr_6O_{11}$ (by weight); and
    said support oxide is support oxide comprises $La_{X\%}Zr_{(1-X)\%}O_2$ and/or $Pr_{X\%}Zr_{(1-X)\%}O_2$.

2. The support oxide of claim 1, wherein said support oxide comprises $La_{5\%}Zr_{95\%}O_2$, $Pr_{5\%}Zr_{95\%}O_2$, $La_{10\%}Zr_{90\%}O_2$, $Pr_{10\%}Zr_{90\%}O_2$, $La_{15\%}Zr_{85\%}O_2$, $Pr_{15\%}Zr_{85\%}O_2$, or mixtures thereof.

3. A catalyst system according to claim 1 comprising an overcoat, wherein said overcoat comprises an oxygen storage material (OSM) and a support oxide in a 1.5:1 ratio (by weight), wherein:
    said OSM is 30% $CeO_2$, 60% $ZrO_2$, 5% $Nd_2O_3$, and 5% $Pr_6O_{11}$ (by weight); and
    said support oxide is $Pr_{0.10}Zr_{0.90}O_2$.

4. The catalyst system of claim 3, wherein said catalyst system further comprises a washcoat, wherein said washcoat comprises an OSM and a support oxide in a 1.5:1 ratio (by weight), wherein:

said OSM is 30% $CeO_2$, 60% $ZrO_2$, 5% $Nd_2O_3$ and 5% $Pr_6O_{11}$ (by weight); and said support oxide is $La-Al_2O_3$.

5. A catalytic convertor system comprising the catalyst system of claim 3.

6. The catalytic convertor system of claim 5, wherein said catalytic convertor comprises two or more catalytic converters.

7. The catalytic convertor system of claim 6, wherein said catalytic convertor system comprises a close coupled catalytic converter.

* * * * *